(12) United States Patent
Namari et al.

(10) Patent No.: US 7,826,959 B2
(45) Date of Patent: Nov. 2, 2010

(54) CRUISE CONTROLLER FOR SADDLE-SEAT VEHICLE

(75) Inventors: Takashi Namari, Tochigi (JP); Toru Shiitsuka, Tochigi (JP); Hideki Watanabe, Tochigi (JP)

(73) Assignee: Keihin Corporation, Tokyo (JP)

( * ) Notice: Subject to any disclaimer, the term of this patent is extended or adjusted under 35 U.S.C. 154(b) by 350 days.

(21) Appl. No.: 12/094,075

(22) PCT Filed: Nov. 8, 2006

(86) PCT No.: PCT/JP2006/322237

§ 371 (c)(1),
(2), (4) Date: May 16, 2008

(87) PCT Pub. No.: WO2007/058094

PCT Pub. Date: May 24, 2007

(65) Prior Publication Data

US 2009/0173562 A1  Jul. 9, 2009

(30) Foreign Application Priority Data

Nov. 16, 2005  (JP)  ............................. 2005-331885

(51) Int. Cl.
 *G06F 19/00* (2006.01)
 *F02D 41/02* (2006.01)
 *B60K 31/04* (2006.01)
(52) U.S. Cl. .................... 701/110; 180/179; 123/350; 701/94
(58) Field of Classification Search ............... 123/350, 123/352, 361, 396, 399; 701/93, 94, 101–103, 701/110, 114, 115; 180/170, 178, 179; 74/488, 74/489, 491, 492
See application file for complete search history.

(56) References Cited

U.S. PATENT DOCUMENTS 3,982,446 A * 9/1976 Van Dyken ............... 74/488

(Continued)

FOREIGN PATENT DOCUMENTS

JP  61-287828 A  12/1986

(Continued)

OTHER PUBLICATIONS

International Search Report of PCT/JP2006/322237, date of mailing Mar. 6, 2007.

*Primary Examiner*—Willis R Wolfe, Jr.
(74) *Attorney, Agent, or Firm*—Westerman, Hattori, Daniels & Adrian, LLP

(57) ABSTRACT

In a cruise controller for a saddle-seat vehicle, it is configured to comprise desired throttle opening control execution means (ECU 110) for executing desired throttle opening control by operating the actuator (74) such that the actual throttle opening becomes the desired throttle opening, determine whether the throttle opening command APS is in a predetermined relationship with the actual throttle opening TPS (S60), and switch the cruise control to the desired throttle opening control (S50) when it is discriminated that they are in the predetermined relationship and a disable condition has been established (S62 to S66). By suitably setting the predetermined relationship, the cruise control can be disabled and shifted to the desired throttle opening control at the actual throttle opening anticipatable by the operator, so that driving feel is not impaired and no unnecessary engine output is produced upon switching to the desired throttle opening control.

17 Claims, 11 Drawing Sheets

U.S. PATENT DOCUMENTS

| | | | |
|---|---|---|---|
| 4,838,780 A | 6/1989 | Yamagata et al. | |
| 5,014,804 A * | 5/1991 | Suzuki | 180/178 |
| 5,713,428 A * | 2/1998 | Linden et al. | 180/179 |
| 6,978,694 B2 * | 12/2005 | Peppard | 74/489 |
| 7,160,227 B2 * | 1/2007 | Kuwahara et al. | 701/56 |
| 2005/0161022 A1 | 7/2005 | Kishi et al. | |

FOREIGN PATENT DOCUMENTS

| | | |
|---|---|---|
| JP | 63-162339 A | 7/1988 |
| JP | 4-279735 A | 10/1992 |
| JP | 11-078596 A | 3/1999 |
| JP | 2004-156546 A | 6/2004 |
| JP | 2005-207416 A | 8/2005 |

* cited by examiner

CRUISE CONTROLLER FOR SADDLE-SEAT VEHICLE

TECHNICAL FIELD

This invention relates to a cruise controller for a saddle-seat vehicle such as a motorcycle, scooter or ATV (All Terrain Vehicle).

BACKGROUND ART

As a conventional cruise controller for a saddle-seat vehicle is known the one taught by Patent Reference 1. The proposed controller is configured to initiate cruise control when the operator operates a speed set switch upon reaching a desired vehicle speed and to enable the cruise control to be temporarily suspended simply by returning the throttle grip (accelerator) in the close direction. In other words, the configuration is such that, in addition to the cruise control being disabled by brake operation and clutch operation, the cruise control is temporarily suspended by returning the throttle grip in the close direction and is restored by again turning the throttle grip in the open direction, thereby facilitating use of engine braking by speed reduction.

Patent Reference 1: Japanese Published Utility Model Application No. 64-5616

However, for non-saddle-seat vehicles, i.e., four-wheeled automobiles, a broad range of so-called Drive-By-Wire throttle control systems have been proposed in which mechanical interconnection between the accelerator (accelerator pedal) located on the floor at the vehicle operator's seat and the throttle valve is disabled, an electric motor or other such actuator is connected to the throttle valve, the accelerator opening (amount of accelerator depression) is detected, and the throttle valve opening is controlled in accordance with the detected accelerator opening and the like to obtain a preset desired throttle valve opening, thereby performing throttle valve control for improving emissions performance and/or fuel-economy.

DISCLOSURE OF THE INVENTION

Problems to be Overcome by the Invention

It is also possible to consider the option of installing such a DBW-type desired throttle opening controller in a saddle-seat vehicle, combining it with the aforesaid cruise control, and switching as desired between desired throttle opening control and cruise control. In such case, there would be the benefit of enjoying the advantage of both control modes, and since it would suffice to add only a speed set switch for the cruise control, there would also be the advantage of simple configuration.

However, the accelerator of a four-wheeled automobile is located on the floor at the vehicle operator's seat to be operated by the operator's foot, while the accelerator of a saddle-seat vehicle constituted as a throttle grip is provided on a steering member (handlebar) to be operated by the operator's hand, so that the operator sometimes unintentionally rotates the throttle grip during steering. In a saddle-seat vehicle, the desired throttle opening is set based on, among others, the throttle opening command inputted by the operator via the throttle grip. Therefore, disabling the cruise control and switching to the desired throttle opening control causes the actual throttle opening to assume a value not anticipated by the operator, so that drive feel is degraded and unnecessary engine output may be produced.

The object of this invention is therefore to overcome the foregoing inconveniences by providing a cruise controller for a saddle-seat vehicle that is equipped with a DBW-type desired throttle opening controller in addition to a cruise controller, which does not cause the actual throttle opening to assume a value not anticipated by the operator when the cruise control is disabled, and therefore does not degrade the drive feel or cause unnecessary engine output.

Means for Overcoming the Problems

In order to achieve the object, as recited in claim 1 mentioned below, this invention is configured to have a cruise controller for a saddle-seat vehicle, at least including: an accelerator constituted as a throttle grip installed at an end of a handle bar to be operable by an operator; throttle valve that is installed in an air intake pipe of an internal combustion engine and regulates an amount of intake air sucked into the engine; an actuator that drives the throttle valve; a speed set switch that is installed to be operable by the operator; vehicle speed detection means for detecting a vehicle speed at a predetermined interval; and cruise control execution means for executing cruise control by storing the vehicle speed detected at the time the speed set switch is operated as a desired vehicle speed and operating the actuator such that the vehicle speed detected at the predetermined interval becomes the stored desired vehicle speed, characterized by: throttle opening detection means for detecting an actual opening of the throttle valve at a predetermined interval; throttle opening command detection means for detecting at a predetermined interval a throttle opening command issued by the operator using the accelerator; desired throttle opening control execution means for executing desired throttle opening control by setting a desired throttle opening in accordance at least with the detected throttle opening command at a predetermined interval and operating the actuator such that the detected actual throttle opening becomes the desired throttle opening; throttle opening determination means for determining whether, when the cruise control is in effect, one of the throttle opening command and the desired throttle opening is in a predetermined relationship with the actual throttle opening; and control switchover means for switching the cruise control to the desired throttle opening control when it is discriminated that one of the throttle opening command and the desired throttle opening is in the predetermined relationship with the actual throttle opening and a disable condition has been established.

As recited in claim 2 mentioned below, this invention is configured such that the control switchover means determines that the predetermined relationship has been established when one of the throttle opening command and the desired throttle opening is near the actual throttle opening, and switches the cruise control to the desired throttle opening control upon discriminating the establishment of the disable condition.

As recited in claim 3 mentioned below, this invention is configured such that the control switchover means determines that the predetermined relationship has been established when a difference between one of the throttle opening command and the desired throttle opening and the actual throttle opening is within a range of ±5 degrees, and switches the cruise control to the desired throttle opening control upon discriminating the establishment of the disable condition.

As recited in claim 4 mentioned below, this invention is configured such that the control switchover means determines that the predetermined relationship has been established when one of the throttle opening command and the desired throttle opening is equal to or less than the actual throttle opening, and switches the cruise control to the desired throttle opening control upon discriminating the establishment of the disable condition.

As recited in claim 5 mentioned below, this invention is configured such that the control switchover means includes: throttle opening command change calculation means for calculating change of the throttle opening command per predetermined unit time; and comparison means for comparing the calculated change with a threshold, and discriminates that the disable condition has been established when the calculated change is equal to or greater than the threshold in the negative direction, and switches the cruise control to the desired throttle opening control.

As recited in claim 6 mentioned below, this invention is configured such that the control switchover means further includes: storing means for storing the throttle opening command detected when the speed set switch is operated; throttle opening command difference calculation means for calculating a difference obtained by subtracting a predetermined value from the stored throttle opening command; and comparison means for comparing the calculated difference with the last value of the throttle opening command among those detected at the predetermined intervals, and discriminates that the disable condition has been established when the last value of the throttle opening command is equal to or less than the calculated difference, and switches the cruise control to the desired throttle opening control.

As recited in claim 7 mentioned below, this invention is configured such that the control switchover means further includes: vehicle speed difference calculation means for calculating a difference obtained by subtracting a predetermined value from the desired vehicle speed; and comparison means for comparing the calculated difference with the last value of the vehicle speed among those detected at the predetermined intervals, and discriminates that the disable condition has been established when the last value of the vehicle speed is equal to or less than the calculated difference, and switches the cruise control to the desired throttle opening control.

As recited in claim 8 mentioned below, this invention is configured such that the cruise control execution means includes: vehicle speed reaching determination means for determining whether the last value of the vehicle speed among those detected at the predetermined intervals has reached the desired vehicle speed; and desired vehicle speed increasing means for increasing the desired vehicle speed by a predetermined value when it is discriminated that the last value of the vehicle speed has reached the desired vehicle speed.

As recited in claim 9 mentioned below, this invention is configured such that the cruise control execution means further includes: brake operation detection means for detecting operation of a brake; vehicle speed determination means for comparing the last value of the vehicle speed among those detected at the predetermined intervals with the desired vehicle speed to determine whether the last value of the vehicle speed is equal to or less than the desired vehicle speed, when the brake operation is detected during execution of the cruise control; and desired vehicle speed substituting means for substituting the last value of the vehicle speed for the desired vehicle speed when it is discriminated that the last value of the vehicle speed is equal to or less than the desired vehicle speed.

As recited in claim 10 mentioned below, this invention is configured such that the cruise control execution means further includes: vehicle speed determination means for comparing the last value of the vehicle speed among those detected at the predetermined intervals with the desired vehicle speed to determine whether the last value of the vehicle speed is equal to or less than the desired vehicle speed; and desired vehicle speed substituting means for substituting the last value of the vehicle speed for the desired vehicle speed when it is discriminated that the last value of the vehicle speed is equal to or less than the desired vehicle speed.

As recited in the cruise controller for a saddle-seat vehicle according to claim 11 mentioned below, this invention is configured to include: a clutch that makes or breaks a connection between the engine and a transmission; throttle full-closed control execution means for executing throttle full-closed control by operating the actuator such that the detected actual throttle opening becomes full closed; and clutch operation determination means for determining whether the clutch was operated; and the control switchover means switches the cruise control to the throttle full-closed control when it is discriminated that the clutch was operated.

As recited in claim 12 mentioned below, this invention is configured such that the clutch operation determination means includes: engine rpm detection means for detecting an engine rpm at a predetermined interval; engine rpm storing means for storing the engine rpm detected at the time the speed set switch is operated as a cruise control start engine rpm; engine rpm determination means for determining whether the last value of the engine rpm among those detected at predetermined time intervals exceeds the stored cruise control start engine rpm by a predetermined value or more; and vehicle speed determination means for determining whether the last value of the vehicle speed is equal to or less than the desired vehicle speed, and discriminates that the clutch was operated when it is discriminated that the last value of the engine rpm exceeds the cruise control start engine rpm by the predetermined value or more and the last value of the vehicle speed is equal to or less than the desired vehicle speed.

As recited in claim 13 mentioned below, this invention is configured such that the clutch operation determination means further includes: clutch operation detection means for producing an output when the clutch is operated, and discriminates that the clutch was operated based on the output of the clutch operation detection means.

As recited in claim 14 mentioned below, this invention is configured such that the control switchover means includes: throttle opening difference calculation means for calculating a difference between the throttle opening command and the actual throttle opening and compares the absolute value of the calculated difference with a predetermined value, and switches the throttle full-closed control to the desired throttle opening control when it is discriminated that the absolute value of the calculated difference is less than the predetermined value.

As recited in claim 15 mentioned below, this invention is configured such that the control switchover means further includes: engine rpm detection means for detecting an engine rpm at a predetermined interval; engine rpm storing means for storing the engine rpm detected at the time the speed set switch is operated as a cruise control start engine rpm; first ratio calculation means for calculating a ratio obtained by dividing the cruise control start engine rpm by the desired vehicle speed as a first ratio; second ratio calculation means for calculating a ratio obtained by dividing the last value of the engine rpm among those detected at the predetermined time intervals by the last value of the vehicle speed among those detected at the predetermined time intervals as a second ratio; and ratio difference calculation means for calculating a difference between the first ratio and the second ratio, and switches the throttle full-closed control to the cruise control when the absolute value of the calculated difference between the first ratio and the second ratio is less than a predetermined value, while continues the throttle full-closed control when the absolute value of the calculated difference between the first ratio and second ratio is equal to or greater than the predetermined value, during execution of the throttle full-closed control.

As recited in the cruise controller for a saddle-seat vehicle according to claim 16 mentioned below, this invention is configured such that the control switchover means switches among the cruise control, the throttle full-closed control and desired throttle opening control in response to operating state.

As recited in claim 17 mentioned below, this invention is configured such that, when it is discriminated that the clutch was operated during execution of the cruise control, the control switchover means executed the throttle full-closed control and then switches to the desired throttle opening control.

EFFECTS OF THE INVENTION

In a cruise controller for a saddle-seat vehicle recited in claim 1, it is configured to comprise desired throttle opening control execution means for executing desired throttle opening control by operating the actuator such that the actual throttle opening becomes the desired throttle opening, determine whether, when the cruise control is in effect, one of the throttle opening command and the desired throttle opening is in a predetermined relationship with the actual throttle opening, and switch the cruise control to the desired throttle opening control when it is discriminated that they are in the predetermined relationship and a disable condition has been established. By suitably setting the predetermined relationship, the cruise control can be disabled and shifted to the desired throttle opening control at the actual throttle opening anticipatable by the operator, so that driving feel is not impaired and no unnecessary engine output is produced upon switching to the desired throttle opening control.

Moreover, the fact that the desired throttle opening controller and cruise controller are switchably combined enables to enjoy the merits of both controllers, and in addition, the configuration can be simple in the point of requiring addition of only the speed set switch for the cruise control.

In the cruise controller in claim 2 mentioned below, it is configured to determine that the predetermined relationship has been established when one of the throttle opening command and the desired throttle opening is near the actual throttle opening, and switch the cruise control to the desired throttle opening control upon discriminating the establishment of the disable condition. Similarly, since the actual throttle opening is near the throttle opening command or the desired throttle opening set based on the throttle opening command etc. when the cruise control is disabled, the actual throttle opening at the time of switching to the desired throttle opening control does not assume a value unanticipated by the operator, thus avoiding impairment of drive feel and generation of unnecessary engine output.

In the cruise controller in claim 3 mentioned below, it is configured to determine that the predetermined relationship has been established when a difference between one of the throttle opening command and the desired throttle opening and the actual throttle opening is within a range of ±5 degrees, and switch the cruise control to the desired throttle opening control upon discriminating the establishment of the disable condition. Similarly, since the actual throttle opening is near the throttle opening command or the desired throttle opening set based on the throttle opening command etc. when the cruise control is disabled, the actual throttle opening at the time of switching to the desired throttle opening control assumes a value still more easily anticipated by the operator, thus avoiding impairment of drive feel and generation of unnecessary engine output.

In the cruise controller in claim 4 mentioned below, it is configured to determine that the predetermined relationship has been established when one of the throttle opening command and the desired throttle opening is equal to or less than the actual throttle opening, and switch the cruise control to the desired throttle opening control upon discriminating the establishment of the disable condition. Similarly, since the cruise control is disabled in a state that allows the operator to perceive the actual throttle opening, the actual throttle opening does not assume a value unanticipated by the operator, so that driving feel is not impaired and no unnecessary engine output is produced.

In the cruise controller in claim 5 mentioned below, it is configured to calculate change of the throttle opening command per predetermined unit time, compare the calculated change with a threshold, discriminate that the disable condition has been established when the calculated change is equal to or greater than the threshold in the negative direction, and switch the cruise control to the desired throttle opening control. With this, in addition to the foregoing effects, it becomes possible to discern instantaneous intention of the operator to decelerate, without installing a brake switch, and to disable the cruise control in optimal agreement with the intention of the operator. Moreover, even if the operator does not return the accelerator (throttle grip) to the position corresponding to throttle full-closed, the intention to decelerate can nevertheless be discerned, thus making it possible to avoid unnecessary decrease in engine rpm, i.e., unnecessary decline in engine output, so that drive feel is not impaired.

In the cruise controller in claim 6 mentioned below, it is configured to store the throttle opening command detected when the speed set switch is operated, calculate a difference obtained by subtracting a predetermined value from the stored throttle opening command, and compare the calculated difference with the last value of the throttle opening command among those detected at the predetermined intervals, and further to discriminate that the disable condition has been established when the last value of the throttle opening command is equal to or less than the calculated difference, and switch the cruise control to the desired throttle opening control. With this, in addition to the foregoing effects, similarly it becomes possible to discern operator intention to decelerate, without installing a brake switch, and to disable the cruise control in optimal agreement with the intention of the operator. Further, even if the operator does not return the accelerator to the position corresponding to throttle full-closed, the intention to decelerate can nevertheless be discerned, thus making it possible to avoid unnecessary decrease in engine rpm, i.e., unnecessary decline in engine output, so that drive feel is not impaired. Furthermore, even when operator intention to disable the cruise control cannot be discerned by the configuration stated in claim 5 because the accelerator is returned gradually, it can be discerned by this configuration.

In the cruise controller in claim 7 mentioned below, it is configured to calculate a difference obtained by subtracting a predetermined value from the desired vehicle speed, compare the calculated difference with the last value of the vehicle speed, discriminate that the disable condition has been established when the last value of the vehicle speed is equal to or less than the calculated difference, and switch the cruise control to the desired throttle opening control. Since the cruise control is disabled when high-load driving such as hill-climbing continues, in addition to the foregoing effects, it becomes possible to lower the load of the engine and avoid emissions performance degradation.

In the cruise controller in claim 8 mentioned below, it is configured to determine whether the last value of the vehicle speed has reached the desired vehicle speed, and increase the desired vehicle speed by a predetermined value when it is discriminated that the last value of the vehicle speed has reached the desired vehicle speed. With this, in addition to the foregoing effects, it becomes possible to easily increase the desired vehicle speed without newly providing a switch or the like. Moreover, unnecessary speed increase can be prevented because the desired vehicle speed is increased upon the last value of the vehicle speed having reached the desired vehicle speed.

In the cruise controller in claim 9 mentioned below, it is configured to include brake operation detection means for detecting operation of a brake, and further to determine whether the last value of the vehicle speed is equal to or less than the desired vehicle speed when the brake operation is detected during execution of the cruise control, and substitute the last value of the vehicle speed for the desired vehicle speed when the determination is affirmative. With this, in addition to the foregoing effects, it becomes possible to easily decrease the desired vehicle speed without newly providing a switch or the like. Further, movement of the throttle valve in the opening direction can be prevented by defining the vehicle speed decreased by brake operation as new desired vehicle speed, thereby lowering the load of the engine.

In the cruise controller in claim 10 mentioned below, it is configured to determine whether the last value of the vehicle speed is equal to or less than the desired vehicle speed, and substitute the last value of the vehicle speed for the desired vehicle speed when the determination is affirmative. With this, in addition to the foregoing effects, it becomes possible to easily decrease the desired vehicle speed without newly providing a switch or the like. Further, the throttle valve is driven in the closing direction more actively, thereby still further lowering the load of the engine.

In the cruise controller in claim 11 mentioned below, it is configured to, in addition to desired throttle opening control execution means, comprise throttle full-closed control execution means for executing throttle full-closed control by operating the actuator such that the detected actual throttle opening becomes full closed, and further to determine whether the clutch was operated and switch the cruise control to the throttle full-closed control when it is discriminated that the clutch was operated. With this, it becomes possible to prevent the engine rpm from revving when the clutch is disengaged. Moreover, when it is discriminated that the clutch was operated, the operator can be made aware that the controller recognized the operation by controlling the throttle valve to full closed.

In the cruise controller in claim 12 mentioned below, it is configured to detect an engine rpm at a predetermined interval, store the engine rpm detected at the time the speed set switch is operated as a cruise control start engine rpm, determine whether the last value of the engine rpm among those detected at predetermined time intervals exceeds the stored cruise control start engine rpm by a predetermined value or more, and discriminate that the clutch was operated when it is discriminated that the last value of the engine rpm exceeds the cruise control start engine rpm by the predetermined value or more and the last value of the vehicle speed is equal to or less than the desired vehicle speed. With this, it becomes possible to achieve the effects mentioned in claim 11 without provision of a clutch switch.

In the cruise controller in claim 13 mentioned below, it is configured to include clutch operation detection means for producing an output when the clutch is operated, and further to discriminate that the clutch was operated based on the output of the clutch operation detection means. With this, it becomes possible to achieve even better detection of clutch operation by using the output of the clutch switch, so that the effects mentioned in claim 10 can be realized still more reliably.

In the cruise controller in claim 14 mentioned below, since it is configured to calculate a difference between the throttle opening command and the actual throttle opening, compare the absolute value of the calculated difference with a predetermined value, and switch the throttle full-closed control to the desired throttle opening control when it is discriminated that the absolute value of the calculated difference is less than the predetermined value. Owing to this configuration, driving feel is not impaired. In other words, saddle-seat vehicle gear shifting is ordinarily done after disengaging the clutch and releasing the accelerator (lowering the engine rpm). In the configuration stated in claim 11, the cruise control is disabled and switched to the throttle full-closed control at the time clutch operation is detected, but, thereafter, when a difference between the throttle opening command and actual throttle opening is less than a predetermined value, the control mode is switched to the desired throttle opening control so as to reflect optimally the intention of the operator and thus avoid loss of driving feel.

In the cruise controller in claim 15 mentioned below, it is configured to detect an engine rpm at a predetermined interval, store the engine rpm detected at the time the speed set switch is operated as a cruise control start engine rpm, calculate a ratio obtained by dividing the cruise control start engine rpm by the desired vehicle speed as a first ratio, calculate a ratio obtained by dividing the last value of the engine rpm by the last value of the vehicle speed as a second ratio, calculate a difference between the first ratio and the second ratio, and switch the throttle full-closed control to the cruise control when the absolute value of the calculated difference between the first ratio and the second ratio is less than a predetermined value, while continue the throttle full-closed control when the absolute value of the calculated difference between the first ratio and second ratio is equal to or greater than the predetermined value, during execution of the throttle full-closed control. Since this configuration compares a gear ratio during the cruise control with the most recent gear ratio in the course of throttle full-closed control, it becomes possible to determine whether the clutch was merely operated or gear shifting was also conducted thereafter. Therefore, in the case of operation of the clutch only, the intention of the operator can be optimally reflected by restoring the cruise control, while when gear shifting was also involved, the check as to whether the difference between the throttle opening command and detected throttle opening is within a predetermined range makes it possible to respond to a situation in which the throttle opening command is large notwithstanding that the detected throttle opening is in the full-closed direction by maintaining the full-closed state of the throttle valve to encourage the operator to release the accelerator and thus avoid undesired acceleration or deceleration.

In the cruise controller in claim 16 mentioned below, it is configured to comprise desired throttle opening control execution means and throttle full-closed control execution means, and further to comprise control switchover means for switching among the cruise control, the throttle full-closed control and desired throttle opening control in response to operating state. With this, depending on the operating state, it becomes possible, for example, to prevent revving of the engine rpm by switching from the cruise control to the throttle full-closed control upon discrimination of clutch operation and thereafter switch to the desired throttle opening control to establish control that matches the speed increase/decrease intention of the operator. Further, in accordance with the operating state, such as when the throttle opening command greatly exceeds the actual throttle opening, the switchover to cruise control is delayed until the disparity diminishes, thereby enabling to avoid impairing drive feel and causing unnecessary engine output.

Moreover, the fact that the desired throttle opening controller (and the throttle full-closed controller) and cruise controller are switchably combined enables to enjoy the merits of both controllers, and in addition, the configuration can be simple in the point of requiring addition of only the speed set switch for the cruise control.

In the cruise controller in claim 17 mentioned below, it is configured to, when it is discriminated that the clutch was operated during execution of the cruise control, execute the throttle full-closed control and then switch to the desired throttle opening control. With this, when for example, the throttle opening command greatly exceeds the actual throttle opening, the switchover to cruise control is delayed until the disparity diminishes, thereby enabling to avoid impairing drive feel and causing unnecessary engine output.

BEST MODES OF CARRYING OUT THE INVENTION

Preferred modes of embodying the cruise controller for a saddle-seat vehicle according to this invention will be explained with reference to the attached drawings in the following.

First Embodiment

Figure 1:
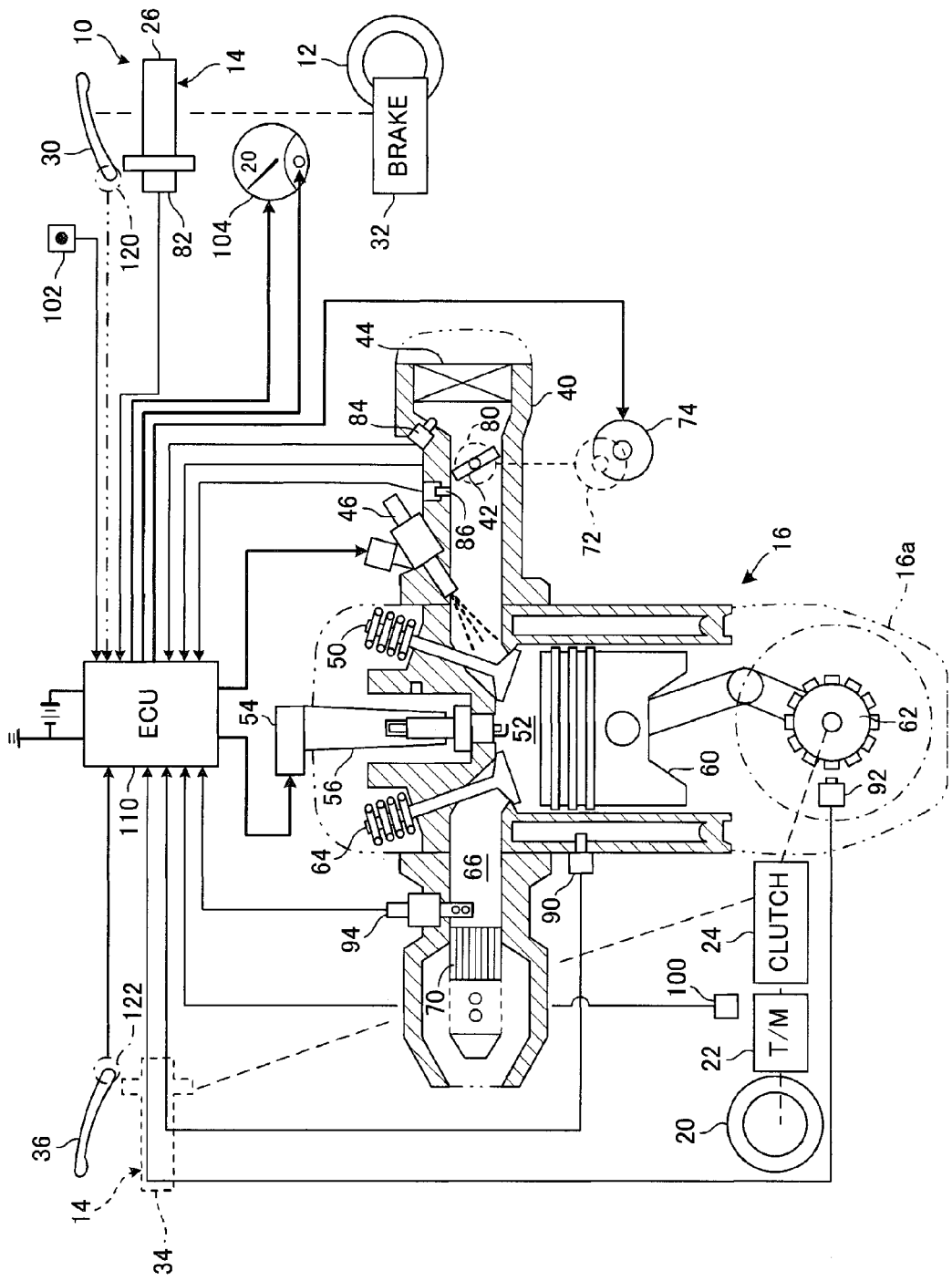
FIG. 1 is a schematic view showing a cruise controller for a saddle-seat vehicle according to a first embodiment of this invention.

FIG. 1 is a diagrammatic view schematically showing a cruise controller for a saddle-seat vehicle according to a first embodiment of this invention. "Saddle-seat vehicle" as termed here means any kind of vehicle that the operator rides by straddling a seat (saddle) and includes, for example, motorcycles, scooters and ATVs (All Terrain Vehicles). In this embodiment, a motorcycle is taken as an example of a saddle-seat vehicle.

In FIG. 1, the motorcycle is designated by the symbol 10. The motorcycle 10 is equipped with a handlebar 14 attached to the upper end of a telescopic fork (not shown) of a front wheel 12, an internal combustion engine 16 mounted at the middle of a frame (not shown), and a rear wheel 20 attached to the rear end of the frame through a shock absorber (not shown). Symbol 16a designates a crankcase of the engine 16.

The output of the engine 16 is varied in rotational speed by a transmission 22 (designated T/M in the drawing) and sent to the rear wheel 20 to drive the motorcycle. A clutch 24 is interposed between the engine 16 and the transmission 22, which, when operated, makes or breaks the connection between the engine 16 and the transmission 22. The transmission 22 is a manual transmission with six forward gear speeds.

The right end of the handlebar 14 (as viewed by the operator) is equipped with an accelerator 26, more specifically an accelerator 26 constituted as a throttle grip to be operable by the operator, and with a front wheel brake lever 30 to be operable by the operator. The front wheel brake lever 30 is mechanically connected to a front wheel brake 32 through a hydraulic cylinder (not shown). When operated (gripped) by the operator, it operates the front wheel brake 32 to brake the front wheel 12.

The left end of the handlebar 14 is equipped with a grip 34 that the operator can grip and with a clutch lever 36. The clutch lever 36 is mechanically connected to the clutch 24 thorough a cable (not shown). When operated (gripped) by the operator, it operates the clutch 24 to make or break, i.e., connect or disconnect, power transmission from the engine 16 to the transmission 22. A shift lever (not shown) is provided near a foot step on the lower left side of the frame, which the operator moves up and down by foot to select one gear speed (gear position or gear ratio) among the six forward gear speeds.

The engine 16 is a 4-cycle, 4-cylinder, water-cooled gasoline engine having a displacement of around 600 cc. Only one of the cylinders is shown in FIG. 1.

A throttle valve 42 installed in an air intake pipe 40 of the engine 16 regulates the amount of intake air that enters through an air cleaner 44 to flow through the air intake pipe 40. Intake ports located at the terminal ends of branch pipes of an intake manifold (not shown) situated downstream of the throttle valve 42 in the air intake pipe 40 are equipped with respective injectors 46 for injecting gasoline fuel into the intake air regulated by the throttle valve 42. The fuel injected by each injector 46 mixes with intake air to form an air-fuel mixture that flows into a combustion chamber 52 when an intake valve 50 opens.

The air-fuel mixture flowing into the combustion chamber 52 is ignited to burn by a spark discharge from a spark plug 56 supplied with high voltage from an ignition coil 54, thereby driving a piston 60 downward in the drawing to rotate a crankshaft 62. When an exhaust valve 64 opens, the exhaust gas produced by the combustion passes through an exhaust system 66 comprising an exhaust manifold and exhaust pipe. The exhaust system 66 is equipped with a catalytic converter 70 for removing harmful components of the exhaust gas. The exhaust gas purified by the catalytic converter 70 continues to pass downstream to be discharge outside the engine 16.

As illustrated, the throttle valve 42 is mechanically separated from the accelerator (throttle grip) 26. Specifically, the throttle valve 42 is connected to an electric motor (DC motor; actuator) 74 through a reduction gear mechanism 72 to be opened and closed by operation of the motor 74. The throttle valve 42 is thus operated by a DBW system using the motor 74.

A throttle opening sensor (throttle opening detection means) 80 constituted of a potentiometer is provided near the throttle valve 42 and produces an output TPS indicative of the actual opening of the throttle valve 42 (hereinafter called the "actual throttle opening") between around 0 degree and around 90 degrees. Similarly, an accelerator opening sensor (accelerator position detection means) 82 constituted of a potentiometer is provided near the accelerator 26 and produces an output APS in response to the opening of the accelerator 26 (more exactly, the amount of rotation of the throttle grip).

The opening of the accelerator 26 is set to correspond to a throttle opening near 0 degree in the unrotated position and to a throttle opening near 90 degrees at full rotation, so that the output APS corresponds to the throttle opening command inputted by the operator.

An intake air temperature sensor 84 installed upstream of the throttle valve 42 of the air intake pipe 40 produces an output TA indicative of the temperature of the intake air, and an absolute pressure sensor 86 installed downstream thereof produces an output PBA indicative of the absolute pressure in the air intake pipe (engine load). A coolant temperature sensor 90 attached to a coolant passage (not shown) of the cylinder block of the engine 16 produces an output TW corresponding to the engine coolant temperature.

A crank angle sensor (engine rpm detection means) 92 installed near the crankshaft 62 of the engine 16 outputs a crank angle signal at a predetermined crank angle position of a specific cylinder (e.g., the first cylinder).

An oxygen sensor 94 installed in the exhaust system 66 on the upstream side of the catalytic converter 70 produces an output corresponding to the oxygen concentration of the exhaust gas. Further, a vehicle speed sensor 100 installed near the output shaft (not shown) of the transmission 22 produces an output every rotation of the output shaft.

A speed set switch 102 is installed at an appropriate location on the handlebar 14 to be operable by the operator. When operated, the speed set switch 102 produces an output indicating a cruise control execution command by the operator. A speedometer 104 is also installed at an appropriate location on the handlebar 14.

The aforesaid sensors, the speed set switch 102 and the speedometer 104 are electrically connected to an ECU (Electronic Control Unit) 110. The ECU 110 is a microcomputer that receives the outputs of the sensors and the like, counts the outputs of the crank angle sensor 92 and vehicle speed sensor 100, and detects (computes) the engine rpm NEM and the motorcycle 10 speed VSP. Based on these detected values and other input values, the ECU 110 executes the cruise control, desired throttle opening control, and throttle full-closed control, as explained in the following.

Figure 2:
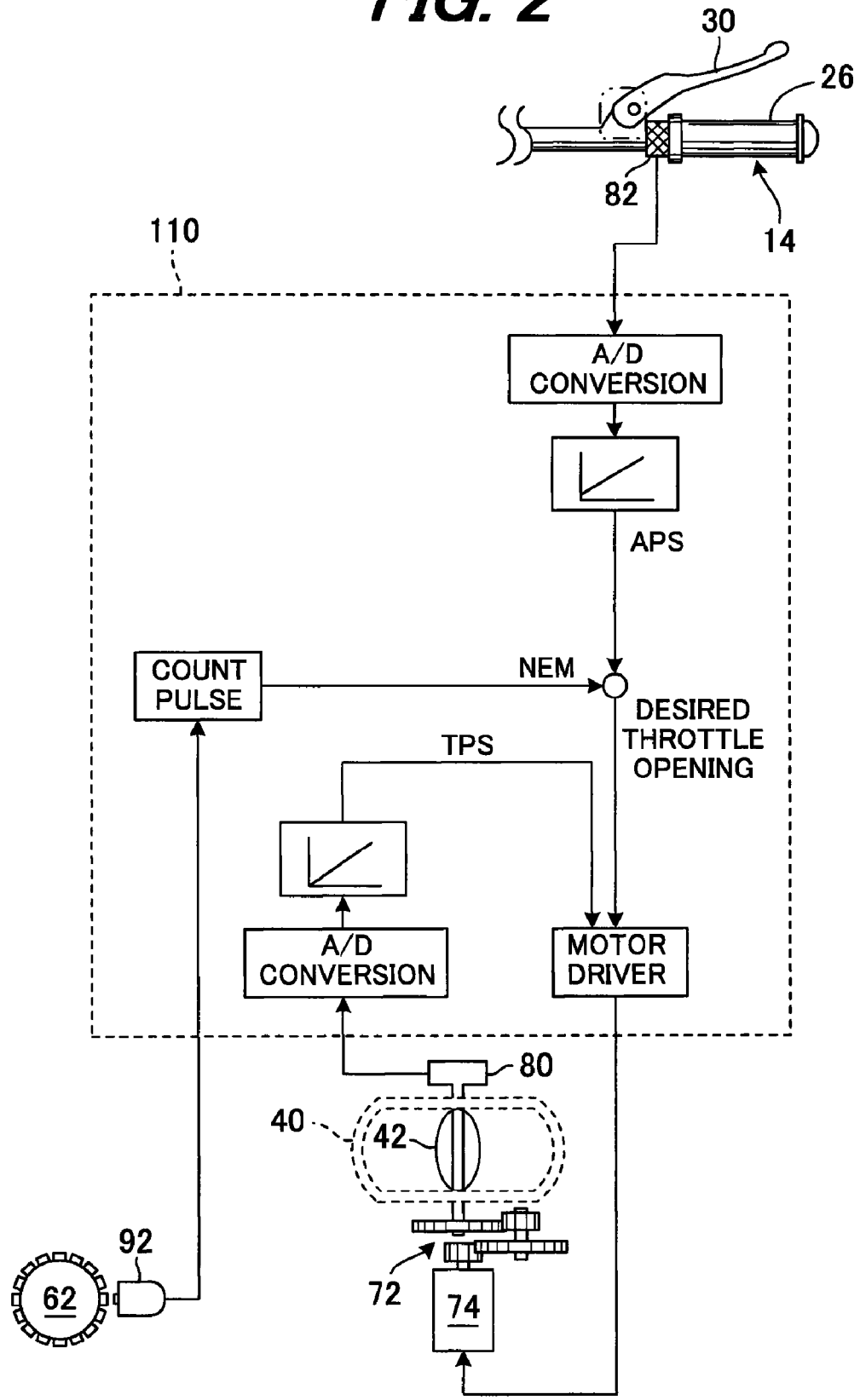
FIG. 2 is a block diagram showing desired throttle opening control conducted by an ECU shown in FIG. 1.

FIG. 2 is a block diagram showing the desired throttle opening control conducted by the ECU 110.

As illustrated, the output of the accelerator opening sensor 82 is Analog-to-Digital converted and the A/D converted value is transformed using a suitable characteristic curve to obtain a value corresponding to a throttle opening value between about 0 degree and about 90 degrees, specifically to a throttle opening command APS (i.e., the throttle opening command APS is detected). Next, the throttle opening command APS and the engine rpm NEM detected by counting the output pulses of the crank angle sensor 92 are used to extract a desired throttle opening from a suitable characteristic curve.

On the other hand, the output of the throttle opening sensor 80 is also Analog-to-Digital converted and the A/D converted value is similarly transformed using a suitable characteristic curve to obtain a value corresponding to an opening of between about 0 degree and about 90 degrees of the throttle valve 42, specifically to an actual throttle opening TPS (i.e., the actual throttle opening TPS is detected). The ECU 110 computes a command value for making the detected actual throttle opening TPS equal to the desired throttle opening defined based on the throttle opening command APS (more specifically, based on the throttle opening command APS and the engine rpm NEM) and outputs the command value through a motor driver 112 to drive the motor 74.

The aforesaid is equivalent to setting the desired throttle opening in the desired throttle opening control, and the operation of the motor 74 is controlled in the cruise control to make the vehicle speed VSP equal to a desired vehicle speed VSPCRS.

Figure 3:
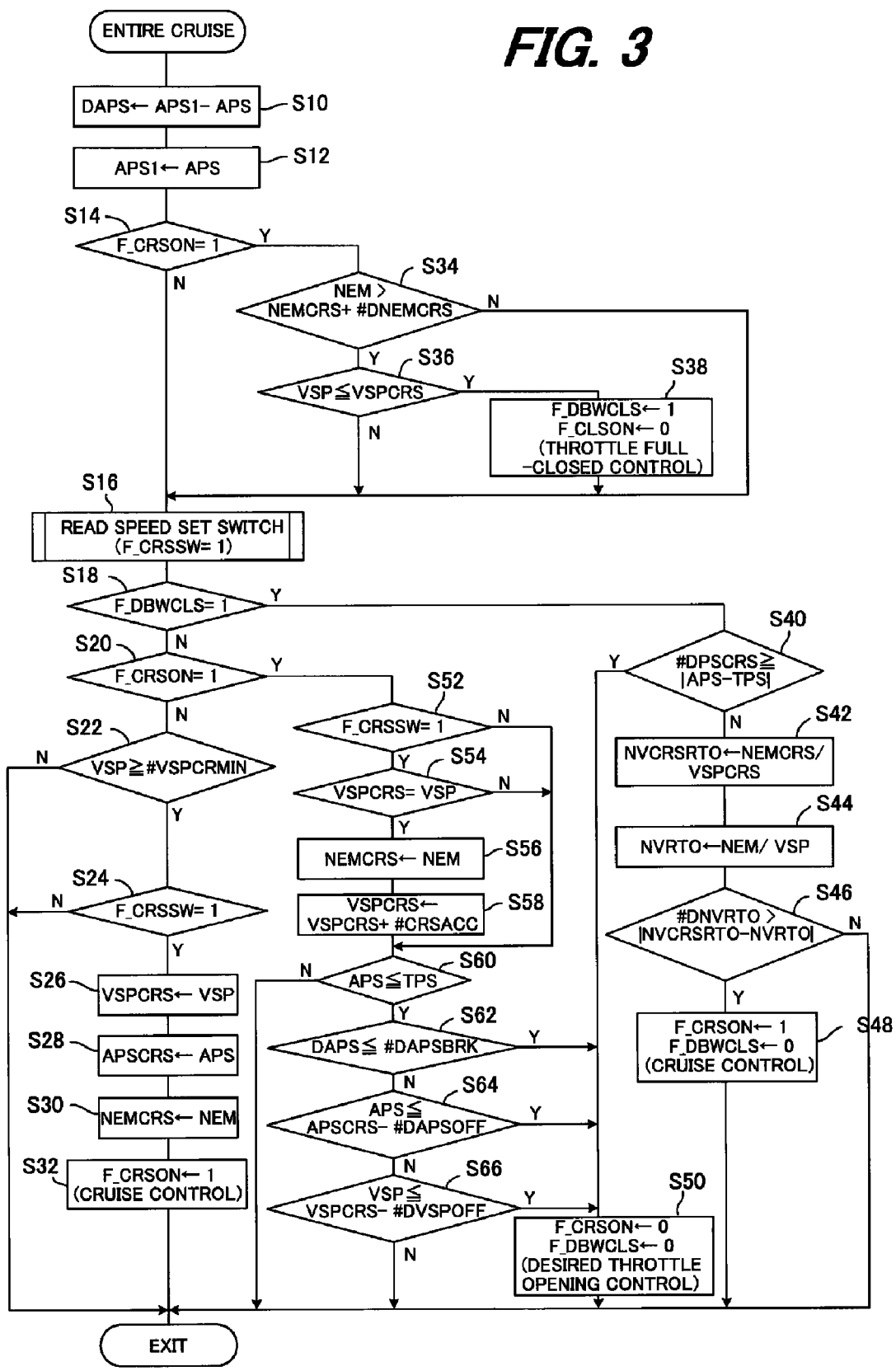
FIG. 3 is a flowchart showing the sequence of operations of the cruise controller shown in FIG. 1.

FIG. 3 is a flowchart showing the sequence of operations of the cruise controller of the saddle-seat vehicle according to this embodiment. The program shown in the drawing is executed by the ECU 110 at predetermined intervals of, for example, 100 msec (millisecond).

The flowchart will be explained. In S10, the current cycle throttle opening command APS is subtracted from the preceding cycle throttle opening command APS1 to calculate a difference DAPS. Next, in S12, the current cycle throttle opening command APS is substituted for the preceding cycle throttle opening command APS1. This is to prepare for the processing in S10 in the next program loop.

Next, in S14, it is determined whether the bit of a flag F_CRSON is set to 1. Since the bit of this flag is initially 0, the result in S14 in the first program loop is ordinarily NO, so that program proceeds to S16, in which the output of the speed set switch 102 is read. In other processing not shown in the drawing, the bit of a flag F_CRSSW is set to 1 every time the speed set switch 102 produces an output in response to operation by the operator. In the processing of S16, therefore, whether or not the operator operated the speed set switch 102 is determined by referring to the bit of this flag.

Next, in S18, it is determined whether the bit of a flag F_DBWCLS is set to 1. Since the bit of this flag is also initially 0, the result in S18 in the first program loop is NO, so that the program proceeds to S20, in which it is determined whether the bit of the flag F_CRSON is set to 1.

In the first program loop, the result is ordinarily NO and the program proceeds to S22, in which it is determined whether the detected vehicle speed VSP is equal to or greater than a predetermined value #VSPCRMIN. The predetermined value #VSPCRMIN is a cruise-control-permitted vehicle speed defined as a value of, for example, around 25 km/h to 30 km/h. The cruise-control-permitted vehicle speed set to a value of this range or thereabouts because the cruise control inherently anticipates high-speed driving.

Therefore, when the result in S22 is NO, the ensuing processing steps are skipped, and when it is YES, the program proceeds to S24, in which it is again determined whether the bit of the flag F_CRSSW is set to 1. When the result in S24 is NO, the ensuing processing steps are skipped, and when it is YES, meaning that the speed set switch 102 was operated, the program proceeds to S26, in which the vehicle speed VSP detected when the speed set switch 102 was operated is substituted for (stored in memory in place of) the desired vehicle speed VSPCRS.

Next, the program proceeds to S28, in which the detected throttle opening command APS is substituted for (stored in memory in place of) a throttle opening command APSCRS defined when the speed set switch 102 was operated, and to S30, in which the detected engine rpm NEM is substituted for (stored in memory in place of) a cruise control start engine rpm NEMCRS. Although the ECU 110 detects the vehicle speed VSP and engine rpm NEM by counting the outputs of the associated sensors at every input, the vehicle speed VSP and engine rpm NEM are detected at predetermined intervals because the program of FIG. 3 is looped periodically (every 100 msec).

Next, in S32, the bit of the flag F_CRSON is set to 1. The bit of this flag being set to 1 means that the cruise control is in effect (cruise control mode ON), and its being reset to 0 means that the cruise control is not in effect (cruise control mode OFF). As explained above, during the cruise control, operation of the motor 74 is controlled to make the vehicle speed VSP coincide with the desired vehicle speed VSPCRS.

In the next loop, therefore, when the program advances through S10 and S12 and reaches S14, the result in S14 becomes YES and the program proceeds to S34, in which it is determined whether the engine rpm NEM (detected in the current program loop; i.e., the last value of the engine rpm among those detected at predetermined time intervals) exceeds the sum obtained by adding a predetermined value #DNEMCRS (e.g., 1,000 rpm) to the cruise control start engine rpm NEMCRS, i.e., whether the engine rpm NEM exceeds the cruise control start engine rpm NEMCRS by a predetermined value or more.

When the result in S34 is YES, since this means that the engine rpm NEM was discriminated to have increased, the program proceeds to S36, in which it is determined whether the vehicle speed VSP (detected in the current program loop; i.e., the last value of the vehicle speed among those detected at predetermined time intervals) is equal to or less than the desired vehicle speed VSPCRS, and when the result is YES, the program proceeds to S38, in which the bit of the flag F_DBWCLS is set to 1 and the bit of a flag F_CLSON is reset to 0. Resetting the bit of the flag F_CLSON to 0 and setting the bit of the flag F_DBWCLS to 1 amounts to disabling the cruise control and switching (shifting) to the throttle full-closed control (throttle full-closed mode).

In concrete terms, the processing of S34 and S36 corresponds to discriminating whether the operator operated the clutch 24, and the program is configured to discriminate that the clutch 24 was operated and to switch from the cruise control to the throttle full-closed control when the last value NEM of the detected engine rpm is found to exceed the cruise control start engine rpm NEMCRS by the predetermined value #DNEMCRS or more and the last value VSP of the detected vehicle speed is equal to or less than the desired vehicle speed VSPCRS.

When the result in S34 is NO, since this means that the clutch 24 was not operated, the processing of S36 and S38 is skipped, and when the result in S36 is NO, the processing of S38 is skipped for the same reason.

Figure 4:
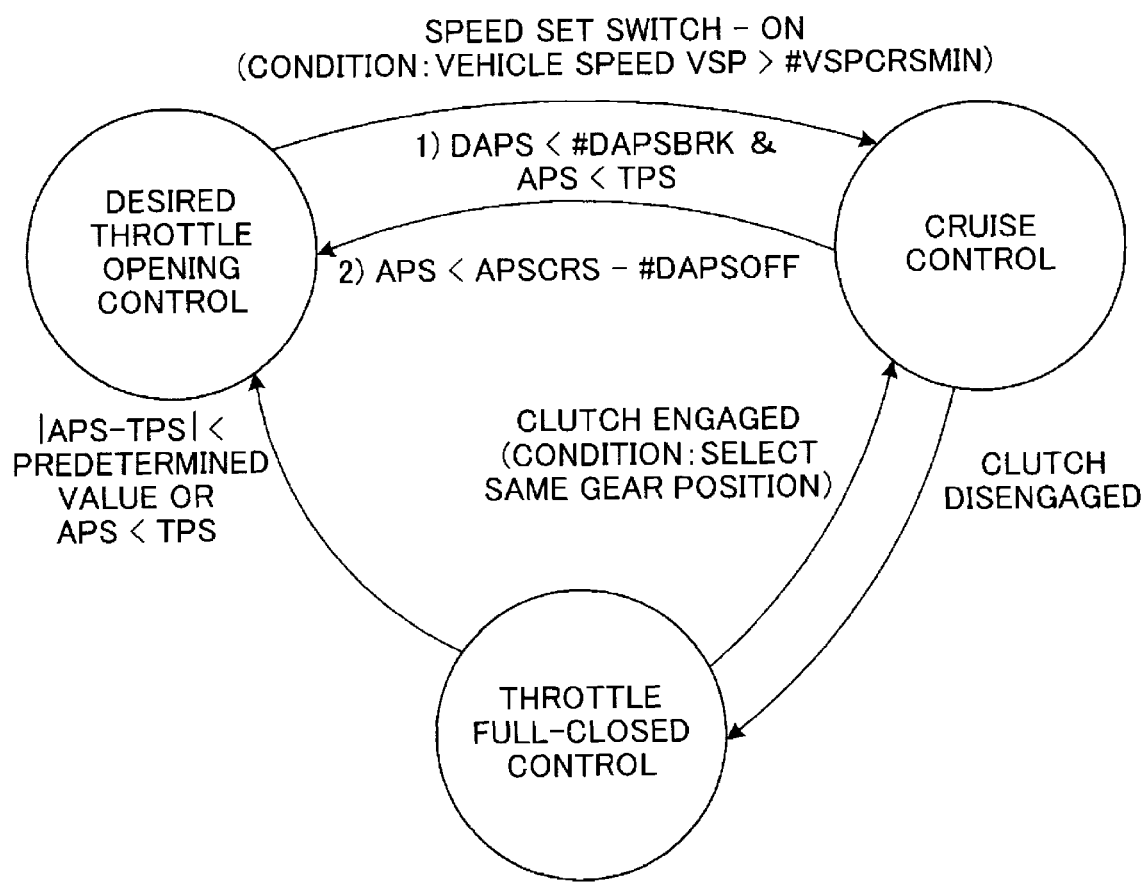
FIG. 4 is a condition transition diagram showing the transition among three control modes that are the operations of the cruise controller shown in FIG. 1.

The control by the cruise controller according to this embodiment will now be summarized with reference to FIG. 4. The controller is provided with three control modes: cruise control, desired throttle opening control, and throttle full-closed control. A configuration is adopted that switches among the three control modes in response to the operating state. Specifically, when a specific disable condition is established, the control switches from the cruise control to the desired throttle opening control that controls the actual throttle opening TPS to a desired throttle opening which is defined to include full-closed, and when another type of disable condition (i.e., clutch operation) is established, it switches from the cruise control to the throttle full-closed control that closes the actual throttle opening TPS to full closed.

Further, the control is configured to respond to establishment of a particular shift or restore condition by switching from the desired throttle opening control or throttle full-closed control to re-establish (restore) the cruise control. In addition, the control is configured to respond to establishment of a particular transition condition by switching from the throttle full-closed control to the desired throttle opening control, but not to do the opposite.

The explanation of FIG. 3 will be continued. The program passes through S16 to S18, in which it is determined whether the bit of the flag F_DBWCLS is set to 1. When S18 is reached via S38, the result in S18 is YES and the program proceeds to S40, in which the difference between the throttle opening command APS and the actual throttle opening TPS (the values thereof detected in the current program loop; i.e., the difference between the last values of the actual throttle opening and the throttle opening command among those detected at predetermined time intervals) is calculated, a predetermined value #DPSCRS and the absolute value of the calculated difference are compared, and whether the predetermined value #DPSCRS is equal to or greater than the absolute value of the difference, i.e., whether the difference is less than the predetermined value #DPSCRS, is determined.

When the result in S40 is NO, the program proceeds to S42, in which a ratio NVCRSRTO obtained by dividing the cruise control start engine rpm NEMCRS by the desired vehicle speed VSPCRS is calculated as a first ratio, and then to S44, in which a ratio NVRTO obtained by dividing the engine rpm NEM (detected in the current program loop; i.e., the last value of the engine rpm among those detected at predetermined time intervals) by the vehicle speed VSP (detected in the current program loop; i.e., the last value of the vehicle speed among those detected at predetermined time intervals) is calculated as a second ratio.

Next, in S46, the difference between the first ratio NVCRSRTO and the second ratio NVRTO is calculated, and it is determined whether the absolute value of the difference between the first ratio and the second ratio calculated during execution of throttle full-closed control is less than a predetermined value #DNVRTO.

The processing of S42 to S46 is for determining whether the gear ratio was changed, specifically for determining whether the same gear was engaged after it was once found by the processing of S34 and S36 that the clutch was disengaged (the clutch was operated to break the connection between the engine 16 and transmission 22). When the absolute value of the difference between the first ratio and second ratio is discriminated to be less than the predetermined value #DNVRTO in S46, it is judged that no large change in the gear ratio was observed and from this that the original gear was reengaged, whereafter, in S48, the bit of the flag F_CRSON is set to 1 and the bit of the flag F_DBWCLS is reset to 0. In other words, the throttle full-closed control is switched to the cruise control (to restore the latter).

Conversely, when the absolute value of the calculated difference between the first ratio and second ratio is discriminated to be equal to or greater than the predetermined value, the change in the gear ratio is large and it is assumed to be unlikely that the same gear was reengaged, so the processing of S48 is skipped. In other words, the throttle full-closed control is continued.

On the other hand, when the result in S40 is YES, i.e., when it is discriminated that the absolute value of the difference between the throttle opening command APS and the actual throttle opening TPS is less than the predetermined value #DPSCRS, the program proceeds to S50, in which the bit of the flag F_CRSON is reset to 0 and the bit of the flag F_DB-WCLS is reset to 0. In other words, the throttle full-closed control is switched to the desired throttle opening control.

Figure 5:
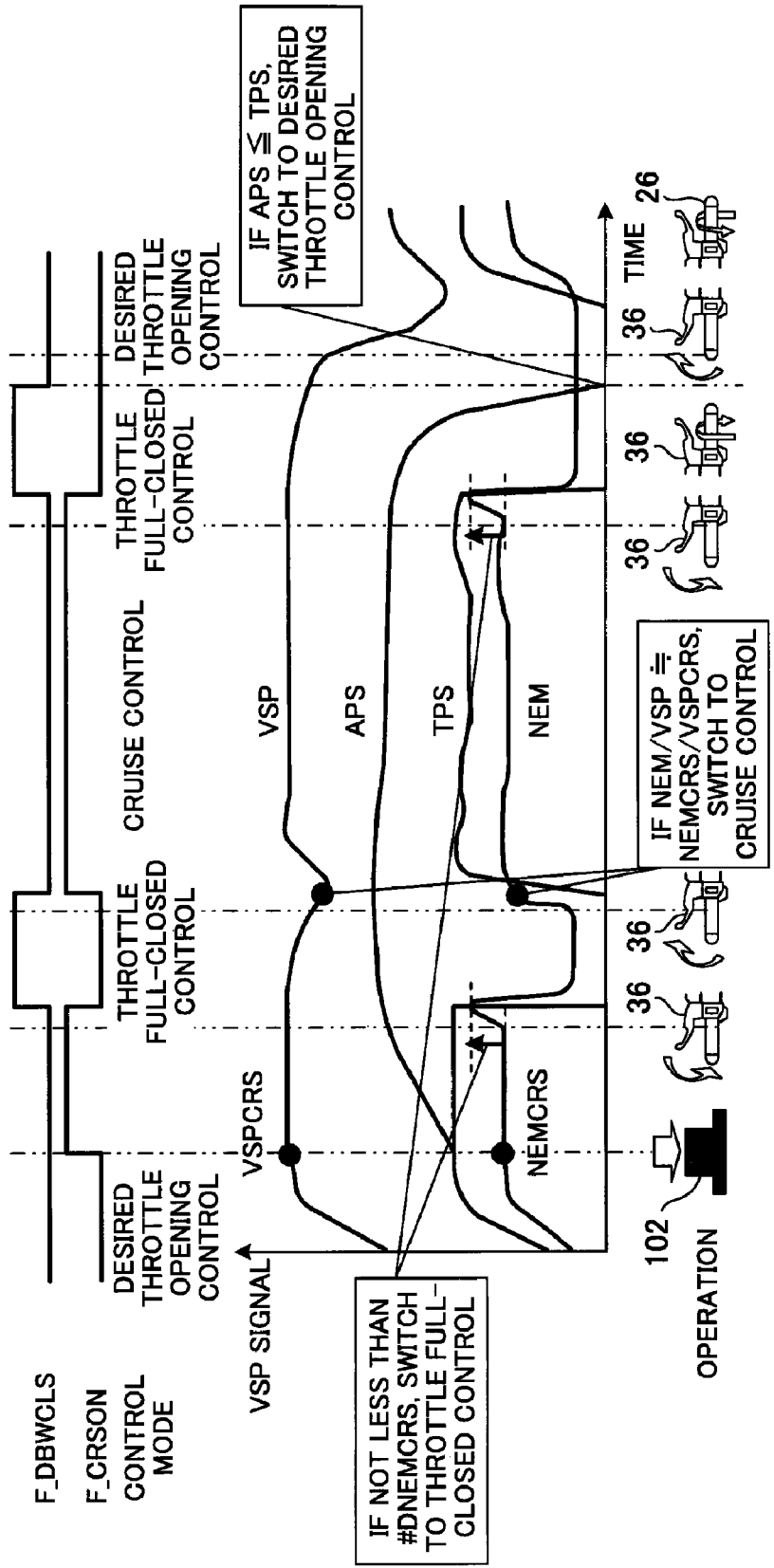
FIG. 5 is a time chart showing the operations of the cruise controller shown in FIG. 3.

FIG. 5 is a time chart showing switchover from the cruise control to the throttle full-closed control in response to discrimination of clutch operation in S34 and S38, and continuation of the throttle full-closed control or switchover thereof to the desired throttle opening control in S40 to S48.

As shown, the determination of whether or not the clutch 24 was operated through the clutch lever 36 is done, and when operation of the clutch 24 is ascertained, the cruise control is switched to the throttle full-closed control. This configuration makes it possible to prevent the engine rpm NEM from revving when the clutch 24 is disengaged. Moreover, when the clutch 24 was operated, the operator can be made aware that the controller recognized the operation by controlling the throttle valve 42 to full closed.

At this time, it is determined whether the last value NEM of the detected engine rpm exceeds the cruise control start engine rpm NEMCRS by the predetermined value #DNEM-CRS or more, and when the result is YES, it is discriminated that the clutch 24 was operated. This configuration enables the aforesaid effect to be achieved without provision of a clutch switch.

In addition, the difference between the last values of the throttle opening command APS and actual throttle opening TPS detected at predetermined time intervals is calculated, the absolute value of the calculated difference is compared with the predetermined value #DPSCRS, and when the absolute value of the calculated difference is equal to or less than the predetermined value, the throttle full-closed control is switched to the desired throttle opening control. This configuration ensures that driving feel is not degraded.

To explain further, saddle-seat vehicle gear shifting is ordinarily done after disengaging the clutch 24 and releasing the accelerator (throttle grip) 26 (lowering the engine rpm). In the foregoing configuration, the cruise control is disabled and switched to the throttle full-closed control at the time clutch operation is detected, but, thereafter, when the absolute value of the difference between the throttle opening command APS and the actual throttle opening TPS is equal to or less than the predetermined value #DPSCRS, i.e., when the two values are close, the control mode is switched to the desired throttle opening control so as to reflect optimally the intention of the operator and thus avoid loss of driving feel.

Further, the engine rpm NEM and vehicle speed VSP are used to calculate first and second ratios, the difference between the ratios is calculated, and when, in the course of throttle full-closed execution, the absolute value of the difference between the first ratio and the second ratio is less than a predetermined value, the throttle full-closed control is switched to the cruise control, but when the absolute value of the calculated difference between the first ratio and the second ratio is equal to or greater than the absolute value, the throttle full-closed control is continued. As this configuration compares the gear ratio during the cruise control with the most recent gear ratio in the course of throttle full-closed control, it becomes possible to determine whether the clutch 24 was merely operated or gear shifting was also conducted thereafter.

Therefore, in the case of operation of the clutch 24 only, the intention of the operator can be optimally reflected by restoring the cruise control, while when gear shifting was also involved, the check as to whether the difference between the throttle opening command APS and the actual throttle opening TPS is within a predetermined range makes it possible to respond to a situation in which the throttle opening command APS is large notwithstanding that the actual throttle opening TPS is in the full-closed direction by maintaining the full-closed state of the throttle valve 42 to encourage the operator to release the accelerator 26 and thus avoid undesired acceleration.

The explanation of the flowchart of FIG. 3 will be continued. When the program terminates upon passing through S48 and then enters the next loop, the result in S18 is NO, so that the program proceeds to S20, in which the result is YES, and to S52, in which it is determined whether the bit of the flag F_CRSSW is set to 1. When the result is YES, the programs proceed to S54, in which it is determined whether the vehicle speed VSP (detected in the current program loop; i.e., the last value of the vehicle speed among those detected at predetermined time intervals) is equal to the desired vehicle speed VSPCRS, i.e., whether the last value VSP of the vehicle speed has reached the desired vehicle speed VSPCRS.

When the result in S54 is YES, the program proceeds to S56, in which the engine rpm NEM detected when the speed set switch 102 was operated during cruise control execution is stored in memory as the cruise control start engine rpm NEM-CRS, and to S58, in which the sum obtained by adding a predetermined value #CRSACC to the desired vehicle speed VSPCRS is defined as the desired vehicle speed VSPCRS. In other words, the desired vehicle speed VSPCRS is increased by the predetermined value #CRSACC when the last value VSP of the vehicle speed is discriminated to have reached the desired vehicle speed VSPCRS.

Figure 6:
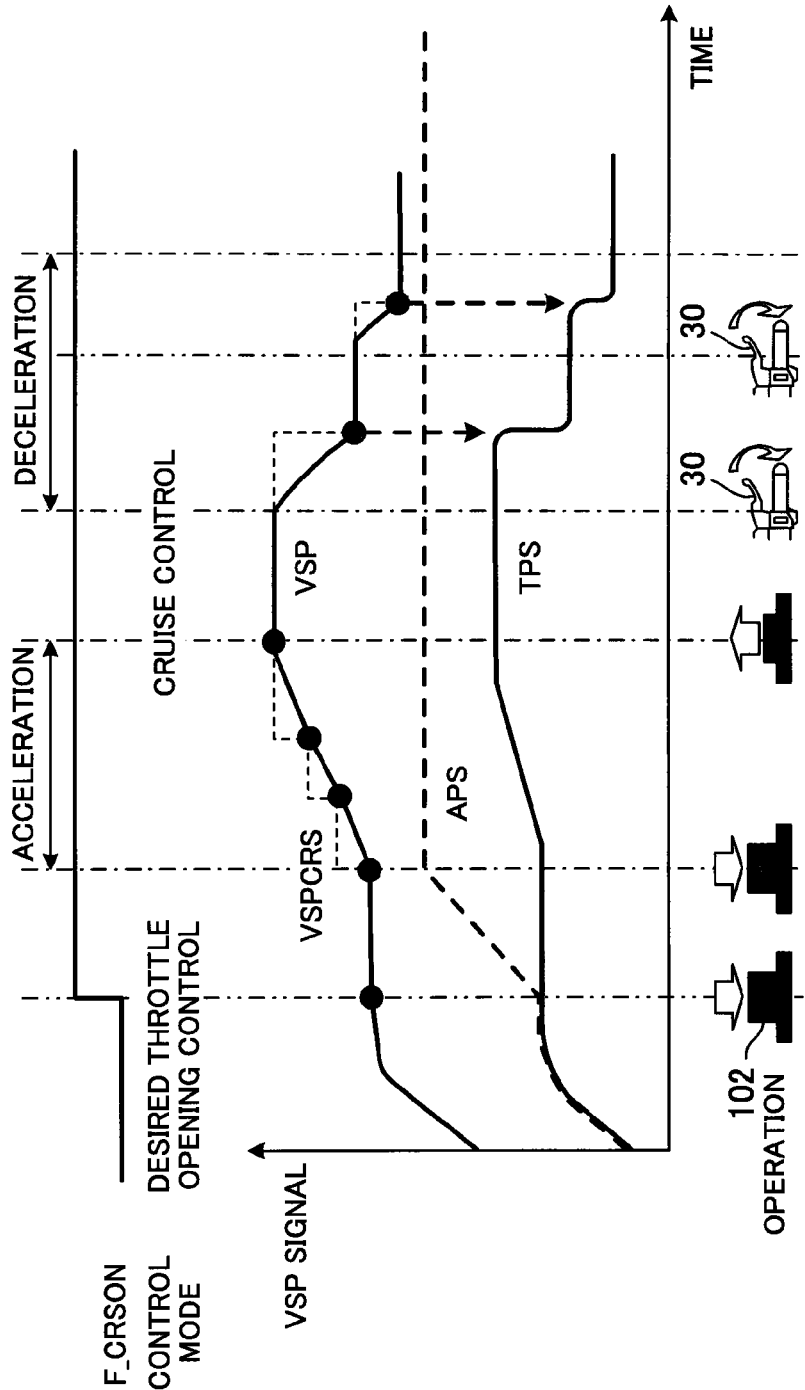
FIG. 6 is a time chart similarly showing the operations of the cruise controller shown in FIG. 3.

FIG. 6 is a time chart showing this processing. As shown, the desired vehicle speed VSPCRS is increased by operating the speed set switch 102. This enables the desired vehicle speed VSPCRS to be easily increased without newly providing a switch or the like. Moreover, unnecessary speed increase can be prevented because the desired vehicle speed VSPCRS is increased only by the amount of the predetermined value upon the last value VSP of the vehicle speed having reached the desired vehicle speed VSPCRS, i.e., even if the speed set switch 102 is operated, the desired vehicle speed VSPCR is not increased until the last value VSP of the vehicle speed reaches the desired vehicle speed VSPCRS.

The explanation of the flowchart of FIG. 3 will be continued. Next, in S60, it is determined whether the throttle opening command APS is at or below the actual throttle opening TPS, i.e., whether the throttle opening command APS and the actual throttle opening TPS are in a predetermined relationship. When the result is YES, they are discriminated to be in the predetermined relationship.

When the result in S60 is YES, the program proceeds to S62, in which the change DAPS of throttle opening command APS per predetermined unit time is compared with a threshold #DAPSBRK to determine whether the calculated change DAPS is equal to or less than the threshold #DAPSBRK. Since the threshold #DAPSBRK is assigned a negative value, the processing of S62 amounts to judging whether the change DAPS is equal to or greater than the threshold #DAPSBRK in the negative direction, i.e., whether the throttle valve 42 is in the closing direction and the change in the closing direction is the same as or larger than the threshold #DAPSBRK (negative value), more specifically whether the accelerator 26 was rapidly closed.

When the result in S62 is YES, it is discriminated that a cruise control disable condition has been established and the program proceeds to S50, in which the bits of the flags F_CRSON and F_DBWCLS are both reset to 0 to switch (shift) the control mode to the desired throttle opening control. On the other hand, when the result is NO, the program proceeds to S64, in which the difference obtained by subtracting a predetermined value #DAPSOFF from the throttle opening command APSCRS detected when the speed set switch 102 was operated is calculated and the calculated difference is compared with the throttle opening command APS (detected in the current program loop; i.e., the last value of the throttle opening command among those detected at predetermined time intervals). And when the last value of the throttle opening command is equal to or less than the calculated difference, it is discriminated that a disable condition has been established and the program proceeds to S50 (the cruise control is switched to the desired throttle opening control).

When the result in S64 is NO, the program proceeds to S66, in which the difference obtained by subtracting a predetermined value #DVSPOFF from the desired vehicle speed VSPCRS is calculated and the calculated difference is compared with the vehicle speed VSP (detected in the current program loop; i.e., the last value of the vehicle speed among those detected at predetermined time intervals). And when the last value of the detected vehicle speed is equal to or less than the calculated difference, it is discriminated that a disable condition has been established and the program proceeds to S50 (the cruise control is switched to the aforesaid desired throttle opening control).

When the result in S66 is NO, the current loop of the program is terminated. When the result in S60 is NO, the remaining steps of the program are skipped.

The foregoing will now be explained with reference FIG. 7 and later figures.

Figure 7:
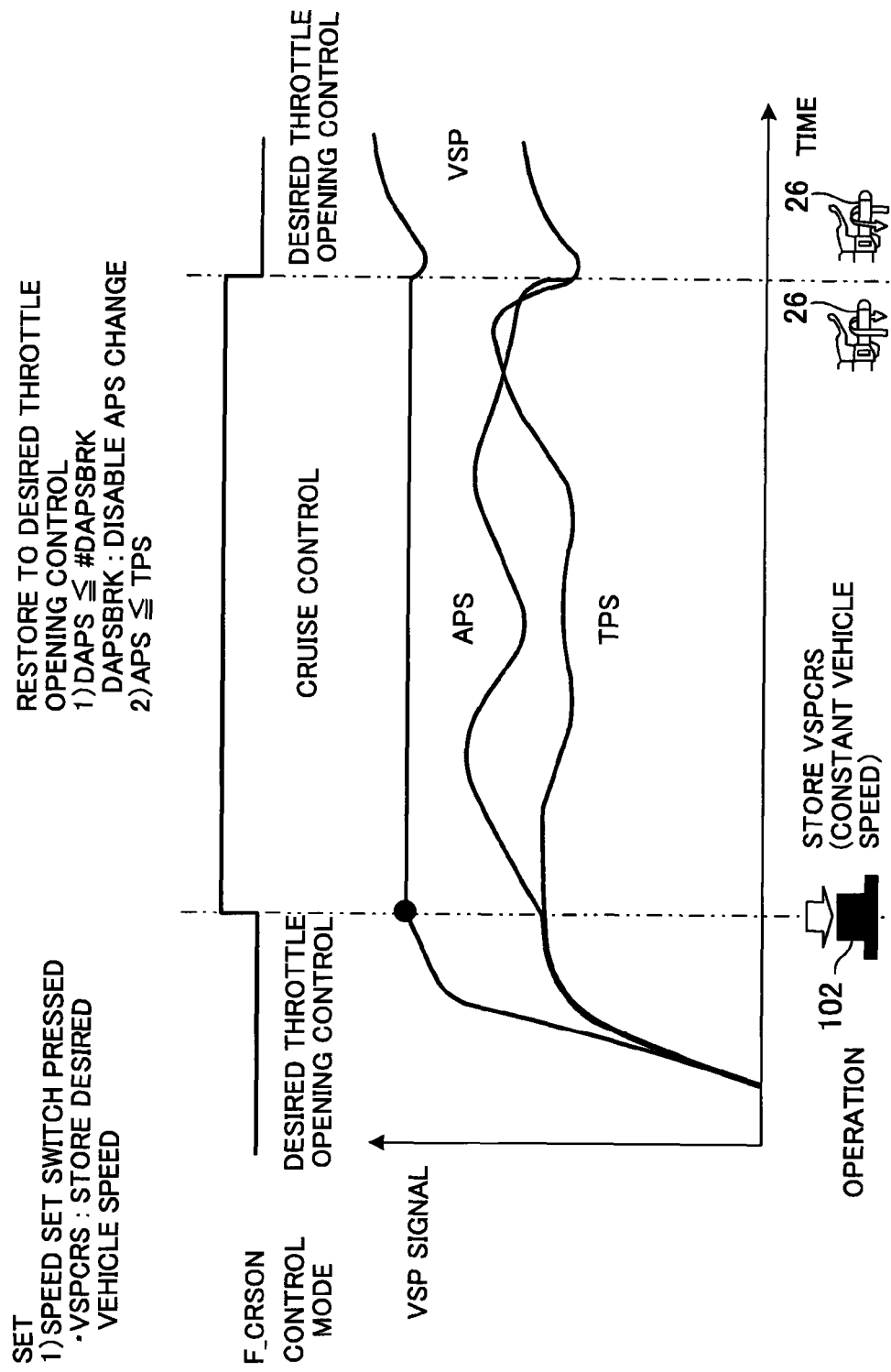
FIG. 7 is a time chart similarly showing the operations of the cruise controller shown in FIG. 3.

FIG. 7 is a time chart showing the processing of S60 to S62 and of S50.

As shown in FIG. 7, the cruise controller for a saddle-seat vehicle according to this embodiment is configured to execute the cruise control that drives the motor 74 to make the vehicle speed VSP become the desired vehicle speed VSPCRS and execute the desired throttle opening control that drives the motor 74 to make the actual throttle opening TPS become the desired throttle opening, to determine whether one or the other of the throttle opening command APS and the desired throttle opening is in a predetermined relationship with the actual throttle opening TPS, specifically whether the throttle opening command APS and the actual throttle opening TPS are in the predetermined relationship, more specifically whether the throttle opening command APS is equal to or less than the actual throttle opening TPS, and to switch from the cruise control to the desired throttle opening control when the predetermined relationship is found and establishment of a disable condition is found.

Therefore, by suitably setting the predetermined relationship, specifically by defining the predetermined relationship to be that the throttle opening command APS is equal to or less than the actual throttle opening TPS, the cruise control can be disabled and shifted to the desired throttle opening control at an actual throttle opening TPS anticipatable by the operator. Similarly, since the cruise control is disabled in a state that allows the operator to perceive the actual throttle opening, the actual throttle opening TPS does not assume a value unanticipated by the operator, so that driving feel is not impaired and no unnecessary engine output is produced upon switching to the desired throttle opening control.

Moreover, the fact that the desired throttle opening controller and cruise controller are switchably combined enables to enjoy the merits of both controllers, and in addition, the configuration can be simple in the point of requiring addition of only the speed set switch 102 for the cruise control.

A disable condition is discriminated to have been established and the cruise control is switched to the desired throttle opening control when, upon calculating the change DAPS of the throttle opening command APS per predetermined unit time (100 msec) and comparing it with the threshold, it is found that the calculated change DAPS is equal to or less than the threshold #DAPSBRK (negative value), i.e., the calculated change DAPS is equal to or greater than the threshold in the negative direction. The configuration therefore not only achieves the foregoing effects but further makes it possible to discern operator intention to decelerate, without installing a brake switch, and to disable the cruise control in optimal agreement with the intention of the operator.

Moreover, even if the operator does not return the accelerator (throttle grip) 26 to the position corresponding to throttle full-closed, the intention to decelerate can nevertheless be discerned, thus making it possible to avoid unnecessary decrease in engine rpm, i.e., unnecessary decline in engine output, so that drive feel is not impaired.

The other disable conditions will be explained.

Figure 8:
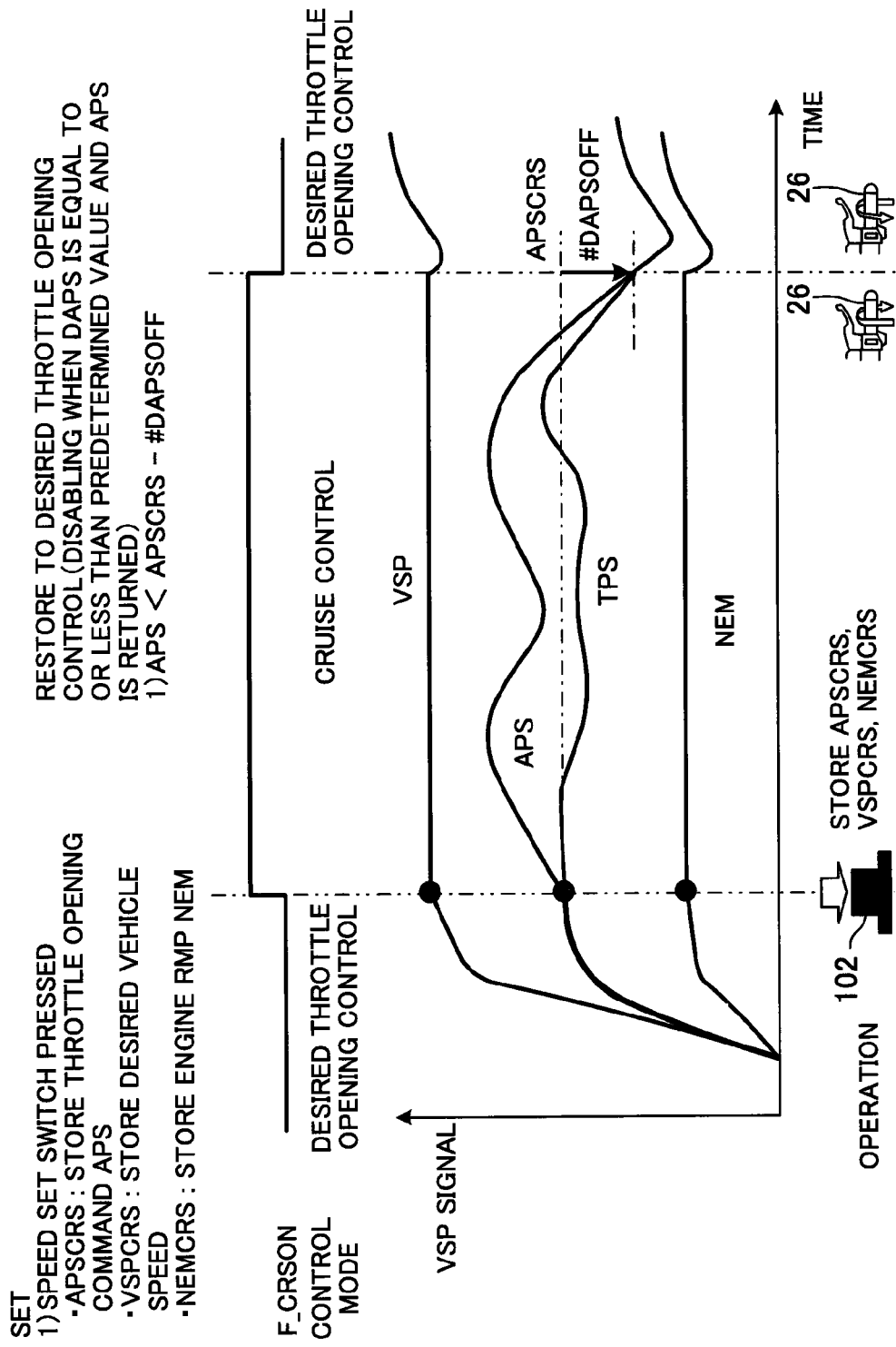
FIG. 8 is a time chart similarly showing the operations of the cruise controller shown in FIG. 3.

FIG. 8 is a time chart showing the processing of S64 and S50.

As shown in the drawing, the throttle opening command APSCRS detected at operation of the speed set switch 102 is stored in memory, the difference obtained by subtracting the predetermined value #DAPSOFF from the stored throttle opening command APSCRS is calculated, the calculated difference is compared with the last value APS of the throttle opening command among those detected at predetermined time intervals (100 msec), and when the last value APS of the throttle opening command is equal to or less than the calculated difference, it is discriminated that a disable condition has been established and the cruise control is switched to the desired throttle opening control. This configuration also makes it possible to discern operator intention to decelerate, without installing a brake switch, and to disable the cruise control in optimal agreement with the intention of the operator, as well as to discern the intention to decelerate even if the operator does not return the accelerator 26 to the position corresponding to throttle full-closed, thus making it possible to avoid unnecessary decrease in engine rpm NEM, i.e., unnecessary decline in engine output, so that drive feel is not impaired. Furthermore, even when operator intention to disable the cruise control cannot be discerned by the processing of S62 because the accelerator 26 is returned gradually, it can be discerned by the processing according to this aspect of the configuration.

Figure 9:
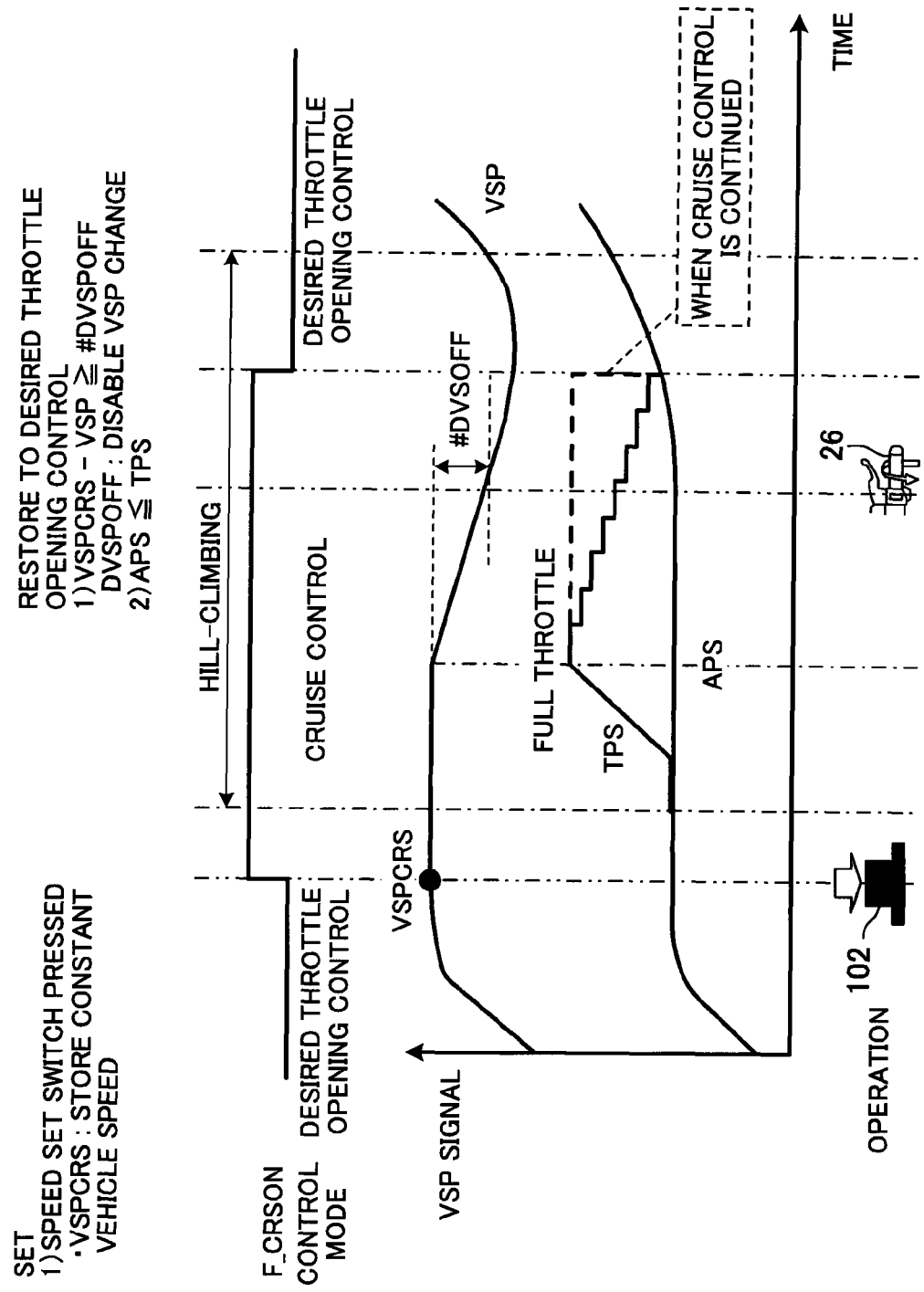
FIG. 9 is a time chart similarly showing the operations of the cruise controller shown in FIG. 3.

FIG. 9 is a time chart showing the processing of S66 and S50.

As shown in the drawing, the difference obtained by subtracting the predetermined value #DVSPOFF from the vehicle speed VSP is calculated, the calculated difference is compared with the last value VSP of the vehicle speed, and when the last value VSP of the vehicle speed is equal to or less than the calculated difference, it is discriminated that a disable condition has been established and the cruise control is switched to the desired throttle opening control. As this configuration disables the cruise control during continuous high-load driving, e.g., during hill-climbing and the like, it becomes possible to lower the load of the engine 16 and avoid emissions performance degradation.

The controller will again be explained in overview with reference to FIG. 4. The controller is provided with three control modes, i.e., cruise control, desired throttle opening control and throttle full-closed control. A configuration is adopted that switches among the three control modes in response to the operating state, so that, depending on the operating state, it is possible, for example, to prevent revving of the engine rpm NEM by switching from the cruise control to the throttle full-closed control upon discrimination of clutch operation and thereafter switch to the desired throttle opening control to establish control that matches the speed increase/decrease intention of the operator. Further, in accordance with the operating state, such as when, for example, the throttle opening command APS greatly exceeds the actual throttle opening TPS, the switchover to cruise control is delayed until the disparity diminishes, thereby enabling to avoid impairing drive feel and causing unnecessary engine output.

Moreover, the fact that the desired throttle opening controller (and the throttle full-closed controller) and cruise controller are switchably combined enables to enjoy the merits of both controllers, and in addition, the configuration is simple in the point of requiring addition of only the speed set switch 102 for the cruise control.

In addition, since operation of the clutch 24 is included as one of the disable conditions, the cruise control can be switched to the throttle full-closed control and revving of the engine rpm NEM can be reliably prevented.

Second Embodiment

A cruise controller for a saddle-seat vehicle according to a second embodiment of the invention will be explained in the following.

Figure 10:
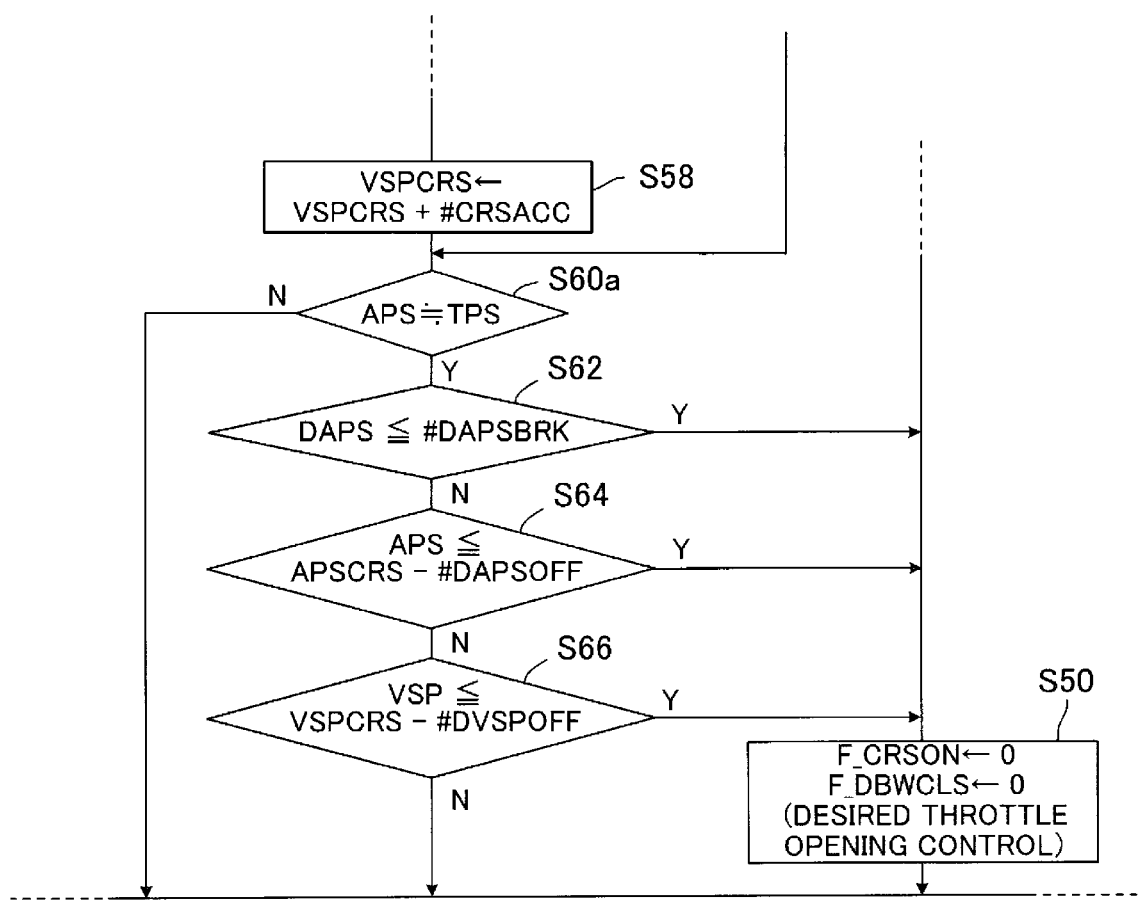
FIG. 10 is a flowchart similar to part of the flowchart of FIG. 3, but partially showing the sequence of operations of a cruise controller for a saddle-seat vehicle according to a second embodiment.

FIG. 10 is a flowchart similar to part of the flowchart of FIG. 3, partially showing the sequence of operations of the controller according to the second embodiment.

The following explanation focuses on the points of difference from the first embodiment. In the second embodiment, the program passes through S58 to S60a, in which it is determined whether the throttle opening command APS is approximately equal to the actual throttle opening TPS, i.e., whether one of the throttle opening command APS and the desired throttle opening, particularly the throttle opening command APS, is near the actual throttle opening TPS, and when the result is YES, it is determined whether the throttle opening command APS and the actual throttle opening TPS are in a predetermined relationship.

In S60a, determination as to whether the throttle opening command APS and the actual throttle opening TPS are approximately equal, i.e., whether the throttle opening command APS is near the actual throttle opening TPS is done by, specifically, determining whether the difference between the throttle opening command APS and actual throttle opening TPS is within the range of ±5 degrees (more exactly, ±5 degrees where full-closed is defined as 0 degree and full-open as 90 degrees).

When the result in S60a is YES, then similarly to in the first embodiment, the program proceeds to S62 and the ensuing processing steps, and when it is discriminated that the disable condition of S62 and ensuing processing steps has been established, the program proceeds to S50, in which the cruise control is switched to the desired throttle opening control. In other words, when the difference is within the range of ±5 degrees, it can be considered that the value assumed will not be one the operator is unable to anticipate, so the second embodiment is configured to switch from the cruise control to the desired throttle opening control so long as the disable condition is established. The range of ±5 degrees is only an example and any range suffices so long as it is anticipated by the operator.

In the second embodiment configured in the foregoing manner, similarly to in the first embodiment, the actual throttle opening TPS is near the throttle opening command APS when the cruise control is disabled, whereby the desired throttle opening at the time of switching to the desired throttle opening control becomes a value still more easily anticipated by the operator, thus avoiding impairment of drive feel and generation of unnecessary engine output.

The remaining aspects of the configuration and the remaining effects are the same as those of the first embodiment.

Third Embodiment

A cruise controller for a saddle-seat vehicle according to a third embodiment of the invention will be explained in the following.

Figure 11:
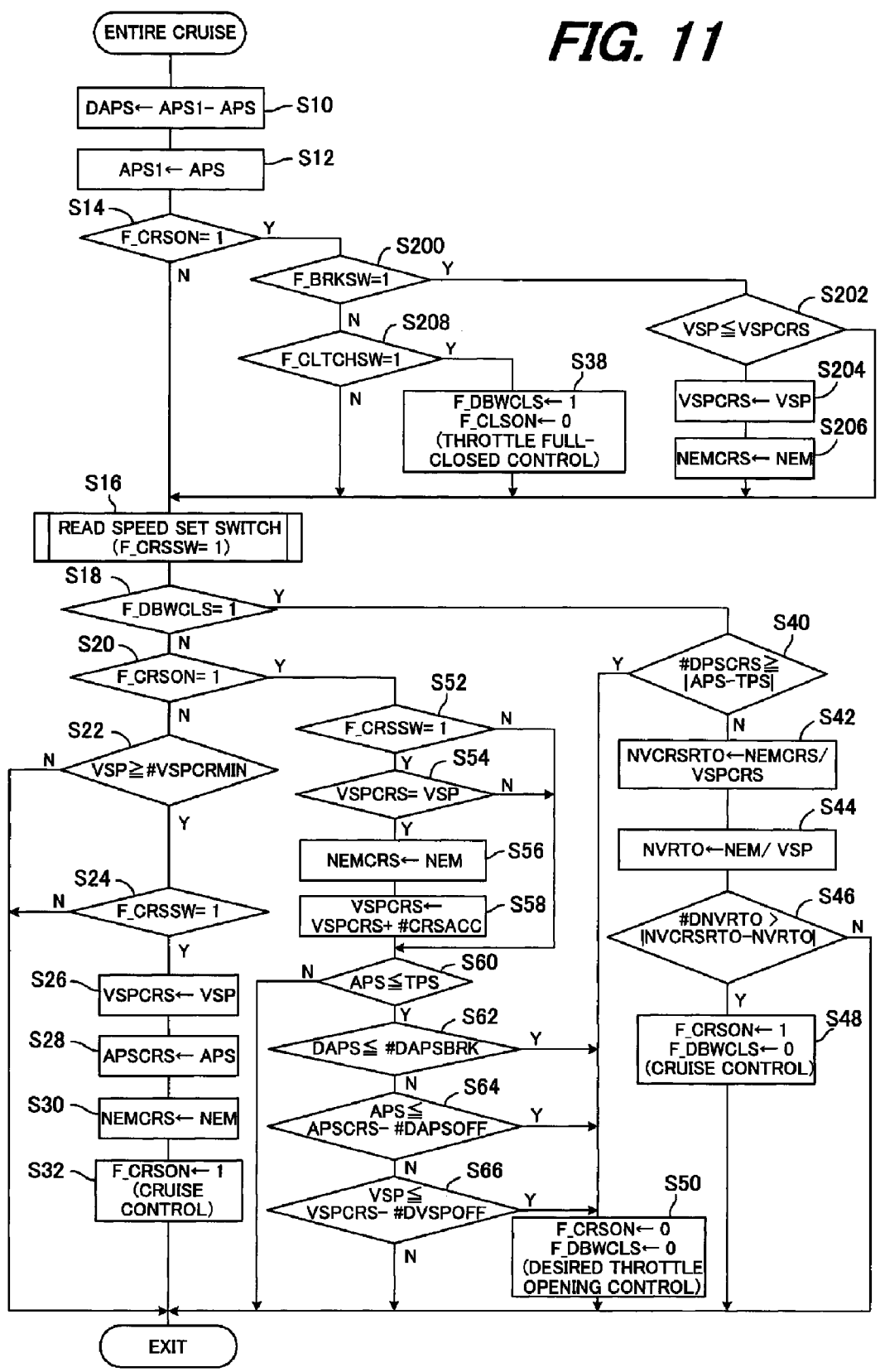
FIG. 11 is a flowchart similar to that of FIG. 3, but showing the sequence of operations of a cruise controller for a saddle-seat vehicle according to a third embodiment.

FIG. 11 is a flowchart similar to that of FIG. 3, showing the sequence of operations of the controller according to the third embodiment. Steps in the flowchart of FIG. 11 that perform the same processing as steps in the flowchart of FIG. 3 are assigned the same reference symbols as in FIG. 3 and explanation thereof will be omitted.

The following explanation focuses on the points of difference from the earlier embodiments. In the third embodiment, when the result in S14 is a YES, the program proceeds to S200, in which brake operation is discriminated.

Specifically, in the third embodiment, as indicated in phantom lines in FIG. 1, the front wheel brake lever 30 is equipped with a brake switch (brake operation detection means) 120 for outputting an ON signal when the operator operates the front wheel brake lever 30 (when the motorcycle 10 is braked), and the clutch lever 36 is equipped with a clutch switch (clutch operation detection means) 122 for outputting an ON signal when the clutch lever 36 is operated (when the clutch 24 is disengaged). The outputs of the brake switch 120 and clutch switch 122 are sent to the ECU 110.

In S200 of the flowchart of FIG. 11, it is determined whether the bit of a flag F_BRKSW is set to 1. In other processing not shown in the drawing, the bit of the flag F_BRKSW is set to 1 when the brake switch 120 outputs an ON signal, so the processing of S200 amounts to discriminating as to whether the brake (front wheel brake 32) was operated by the operator.

When the result in S200 is YES, i.e., when brake operation is detected, the program proceeds to S202, in which the vehicle speed VSP (detected in the current program loop; i.e., the last value of the vehicle speed among those detected at predetermined time intervals) is compared with the desired vehicle speed VSPCRS to determine whether the last value VSP of the vehicle speed is equal to or less than the desired vehicle speed VSPCRS. When the result in S202 is YES, meaning that the last value VSP of the vehicle speed is equal to or less than the desired vehicle speed VSPCRS, the program proceeds to S204, in which the last value VSP of the vehicle speed is made the desired vehicle speed VSPCRS, and to S204, in which the cruise control start engine rpm NEMCRS is changed to the engine rpm NEM. When the result in S202 is NO, the processing of S204 and S206 is skipped. Note that the aforesaid processing is shown in FIG. 6.

On the other hand, when the result in S200 is NO, the program proceeds to S208, in which it is determined whether the bit of a flag F_CLTCHSW is set to 1. In other processing not shown in the drawing, the bit of this flag is set to 1 when the clutch switch 122 outputs an ON signal, so the processing of S208 amounts to discriminating as to whether the clutch was operated (the clutch 24 was disengaged) by the operator.

When the result in S208 is YES, the program proceeds to S38, wherein the bit of the flag F_DBWCLS is set to 1 and the bit of the flag F_CLSON is reset to 0 so as to disable the cruise control and switch (shift) the control mode to the throttle full-closed control (throttle full-closed control mode).

As explained in the foregoing, the third embodiment determines whether the clutch 24 was operated and switches from the cruise control to the throttle full-closed control when it is discriminated that the clutch 24 was operated. This configuration makes it possible to prevent the engine rpm NEM from revving when the clutch 24 is disengaged. Moreover, when it is discriminated that the clutch 24 was operated, the operator can be made aware that the controller recognized the operation by controlling the throttle valve 42 to full closed.

In addition, the clutch 24 is equipped with the clutch switch (clutch operation detection means) 122 for producing an output when the clutch 24 is operated and operation of the clutch 24 is discriminated based on the output of the clutch switch 122. As this configuration utilizes the output of the clutch switch 122 to achieve even better detection of clutch operation, the aforesaid effects can be realized still more reliably.

Further, when brake operation is detected during implementation of cruise control, it is determined whether the last value VSP of the vehicle speed is equal to or less than the desired vehicle speed VSPCRS, and when the result is YES, the last value VSP of the vehicle speed is made (substituted for) the desired vehicle speed VSPCRS. The configuration therefore not only achieves the foregoing effects but further enables the desired vehicle speed VSPCRS to be easily decreased without newly providing a switch or the like. In addition, unnecessary deceleration can be prevented by making the substitution when the vehicle speed VSP is equal to or less than the desired vehicle speed VSPCRS.

It is also possible to configure the third embodiment to determine whether the last value VSP of the vehicle speed is equal to or less than the desired vehicle speed VSPCRS without detecting presence/absence of brake operation during implementation of cruise control, and when the result is YES, substitute the last value VSP of the vehicle speed for the desired vehicle speed VSPCRS.

Moreover, although it was explained that the brake switch 120 is installed near the front wheel brake lever 30 to detect operation of the front wheel brake 32, it is possible instead to install it near the foot brake (not shown) to detect operation of the rear wheel brake (not shown).

The remaining aspects of the configuration and the remaining effects are the same as those of the earlier embodiments.

As stated above, in the first to third embodiments, it is configured to have a cruise controller for a saddle-seat vehicle (motorcycle 10), at least including: an accelerator 26 constituted as a throttle grip installed at an end of a handle bar 14 to be operable by an operator; throttle valve 42 that is installed in an air intake pipe 40 of an internal combustion engine 16 and regulates an amount of intake air sucked into the engine; an actuator (electric motor) 74 that drives the throttle valve; a speed set switch 102 that is installed to be operable by the operator; vehicle speed detection means (vehicle speed sensor 100, ECU 110) for detecting a speed VSP at a predetermined interval (100msec); and cruise control execution means (ECU 110) for executing cruise control by storing the vehicle speed VSP detected at the time the speed set switch is operated as a desired vehicle speed VSP (S26) and operating the actuator such that the vehicle speed detected at the predetermined interval becomes the stored desired vehicle speed, characterized by: throttle opening detection means (throttle opening sensor 80, ECU 110) for detecting an actual opening TPS of the throttle valve at a predetermined interval; throttle opening command detection means (accelerator opening sensor 82, ECU 110) for detecting at a predetermined interval a throttle opening command APS issued by the operator using the accelerator 26; desired throttle opening control execution means (ECU 110) for executing desired throttle opening control by sitting a desired throttle opening in accordance at least with the detected throttle opening command APS, specifically, with the detected throttle opening command APS and the engine rpm NEM at a predetermined interval and operating the actuator such that the detected actual throttle opening TPS becomes the desired throttle opening; throttle opening determination means (S60) for determining whether, when the cruise control is in effect, one of the throttle opening command APS and the desired throttle opening, specifically the throttle opening command APS is in a predetermined relationship with the actual throttle opening TPS; and control switchover means (S50) for switching the cruise control to the desired throttle opening control when it is discriminated that one of the throttle opening command APS and the desired throttle opening is in the predetermined relationship with the actual throttle opening TPS and a disable condition has been established (S62 to S66).

It is configured such that the control switchover means determines that the predetermined relationship has been established when one of the throttle opening command APS and the desired throttle opening is near the actual throttle opening TPS (S60*a*), and switches the cruise control to the desired throttle opening control (S50) upon discriminating the establishment of the disable condition (S62 to S66).

It is configured such that the control switchover means determines that the predetermined relationship has been established when a difference between one of the throttle opening command APS and the desired throttle opening and the actual throttle opening is within a range of ±5 degrees (S60*a*), and switches the cruise control to the desired throttle opening control (S50) upon discriminating the establishment of the disable condition (S62 to S66).

It is configured such that the control switchover means determines that the predetermined relationship has been established when one of the throttle opening command APS and the desired throttle opening is equal to or less than the actual throttle opening TPS (S60), and switches the cruise control to the desired throttle opening control (S50) upon discriminating the establishment of the disable condition (S62 to S66).

It is configured such that the control switchover means includes: throttle opening command change calculation means (S10) for calculating change DAPS of the throttle opening command APS per predetermined unit time; and comparison means (S62) for comparing the calculated change DAPS with a threshold #DAPSBRK, and discriminates that the disable condition has been established when the calculated change is equal to or greater than the threshold in the negative direction, and switches the cruise control to the desired throttle opening control (S50).

It is configured such that the control switchover means further includes: storing means (S28) for storing the throttle opening command APSCRS detected when the speed set switch 102 is operated; throttle opening command difference calculation means (S64) for calculating a difference APSCRS-#DAPSOFF obtained by subtracting a predetermined value #DAPSOFF from the stored throttle opening command; and comparison means (S64) for comparing the calculated difference with the last value APS of the throttle opening command among those detected at the predetermined intervals, and discriminates that the disable condition has been established when the last value of the throttle opening command is equal to or less than the calculated difference, and switches the cruise control to the desired throttle opening control (S50).

It is configured such that the control switchover means further includes: vehicle speed difference calculation means (S66) for calculating a difference VSP-#DVSPOFF obtained by subtracting a predetermined value #DVSPOFF from the desired vehicle speed VSP; and comparison means (S66) for comparing the calculated difference with the last value VSP of the vehicle speed among those detected at the predetermined intervals, and discriminates that the disable condition has been established when the last value of the vehicle speed is equal to or less than the calculated difference, and switches the cruise control to the desired throttle opening control (S50).

It is configured such that the cruise control execution means includes: vehicle speed reaching determination means (S54) for determining whether the last value VSP of the vehicle speed among those detected at the predetermined intervals has reached the desired vehicle speed VSPCRS; and desired vehicle speed increasing means (S58) for increasing the desired vehicle speed by a predetermined value #CRSACC when it is discriminated that the last value of the vehicle speed has reached the desired vehicle speed.

It is configured such that the cruise control execution means further includes: brake operation detection means (brake switch 120, ECU 110, S200) for detecting operation of a brake; vehicle speed determination means (S202) for comparing the last value VSP of the vehicle speed among those detected at the predetermined intervals with the desired vehicle speed VSPCRS to determine whether the last value VSP of the vehicle speed is equal to or less than the desired vehicle speed VSPCRS, when the brake operation is detected during execution of the cruise control; and desired vehicle speed substituting means (S204) for substituting the last value of the vehicle speed for the desired vehicle speed when it is discriminated that the last value of the vehicle speed is equal to or less than the desired vehicle speed.

It is configured such that the cruise control execution means further includes: vehicle speed determination means (S202) for comparing the last value VSP of the vehicle speed among those detected at the predetermined intervals with the desired vehicle speed VSPCRS to determine whether the last value VSP of the vehicle speed is equal to or less than the desired vehicle speed VSPCRS; and desired vehicle speed substituting means (S204) for substituting the last value of the vehicle speed for the desired vehicle speed when it is discriminated that the last value of the vehicle speed is equal to or less than the desired vehicle speed.

It is configured to include: a clutch 24 that makes or breaks a connection between the engine and a transmission 22, throttle full-closed control execution means (ECU 110) for executing throttle full-closed control by operating the actuator such that the detected actual throttle opening becomes full closed, and clutch operation determination means (S34, S36, S208) for determining whether the clutch was operated; and control switchover means (S38) switches the cruise control to the throttle full-closed control when it is discriminated that the clutch was operated.

It is configured such that the clutch operation determination means includes: engine rpm detection means (crank angle sensor 92, ECU 110) for detecting an engine rpm NEM at a predetermined interval; engine rpm storing means (S30) for storing the engine rpm NEM detected at the time the speed set switch is operated as a cruise control start engine rpm NEMCRS; engine rpm determination means (S34) for determining whether the last value of the engine rpm among those detected at predetermined time intervals exceeds the stored cruise control start engine rpm by a predetermined value or more; and vehicle speed determination means (S36) for determining whether the last value VSP of the vehicle speed is equal to or less than the desired vehicle speed VSPCRS, and discriminates that the clutch was operated when it is discriminated that the last value of the engine rpm exceeds the cruise control start engine rpm by the predetermined value or more and the last value of the vehicle speed is equal to or less than the desired vehicle speed (S38).

It is configured such that the clutch operation determination means further includes: clutch operation detection means (clutch switch 122, ECU 110) for producing an output when the clutch 24 is operated, and discriminates that the clutch was operated based on the output of the clutch operation detection means (S208).

Further, it is configured such that the control switchover means includes: throttle opening difference calculation means (S40) for calculating a difference APS-TPS between the throttle opening command APS and the actual throttle opening TPS and compares the absolute value of the calculated difference with a predetermined value #DPSCRS, and switches the throttle full-closed control to the desired throttle opening control when it is discriminated that the absolute value of the calculated difference is less than the predetermined value (S50).

It is configured such that the control switchover means further includes: engine rpm detection means (crank angle sensor 92, ECU 110) for detecting an engine rpm NEM at a predetermined interval; engine rpm storing means (S30) for storing the engine rpm detected at the time the speed set switch 102 is operated as a cruise control start engine rpm NEMCRS; first ratio calculation means (S42) for calculating a ratio obtained by dividing the cruise control start engine rpm NEMCRS by the desired vehicle speed VSPCRS as a first ratio; second ratio calculation means (S44) for calculating a ratio obtained by dividing the last value NEM of the engine rpm among those detected at the predetermined time intervals by the last value VSP of the vehicle speed among those detected at the predetermined time intervals as a second ratio; and ratio difference calculation means (S46) for calculating a difference between the first ratio and the second ratio, and switches the throttle full-closed control to the cruise control when the absolute value of the calculated difference between the first ratio and the second ratio is less than a predetermined value (S48), while continues the throttle full-closed control when the absolute value of the calculated difference between the first ratio and second ratio is equal to or greater than the predetermined value, during execution of the throttle full-closed control.

It is configured such that the control switchover means (S38, S48, S50) switches among the cruise control, the throttle full-closed control and desired throttle opening control in response to operating state.

It is configured such that, when it is discriminated that the clutch was operated during execution of the cruise control, the control switchover means executes the throttle full-closed control and then switches to the desired throttle opening control (S38, S18, S40, S48).

It should be noted that, in the foregoing embodiments, although determination is done whether the throttle opening command APS is in the predetermined relationship with the actual throttle opening TPS, determination can be made whether the desired throttle opening is in the predetermined relationship with the actual throttle opening TPS, instead of the throttle opening command APS. Claim is stated based on this premise.

It should further be noted that the motorcycle is used as an example of a saddle-seat vehicle, but it can be any other type of vehicle.

INDUSTRIAL APPLICABILITY

According to this invention, in the cruise controller for a saddle-seat vehicle, it is configured to comprise desired throttle opening control execution means for executing desired throttle opening control by operating the actuator such that the actual throttle opening becomes the desired throttle opening, determine whether, when the cruise control is in effect, one of the throttle opening command and the desired throttle opening is in a predetermined relationship with the actual throttle opening, and switch the cruise control to the desired throttle opening control when it is discriminated that they are in the predetermined relationship and a disable condition has been established. By suitably setting the predetermined relationship, the cruise control can be disabled and shifted to the desired throttle opening control at the actual throttle opening anticipatable by the operator, so that driving feel is not impaired and no unnecessary engine output is produced upon switching to the desired throttle opening control. Moreover, the fact that the desired throttle opening controller and cruise controller are switchably combined enables to enjoy the merits of both controllers, and in addition, the configuration can be simple in the point of requiring addition of only the speed set switch for the cruise control.

The invention claimed is:

1. A cruise controller for a saddle-seat vehicle, at least including:
    (a) an accelerator constituted as a throttle grip installed at an end of a handle bar to be operable by an operator;
    (b) throttle valve that is installed in an air intake pipe of an internal combustion engine and regulates an amount of intake air sucked into the engine;
    (c) an actuator that drives the throttle valve;
    (d) a speed set switch that is installed to be operable by the operator;
    (e) vehicle speed detection means for detecting a vehicle speed at a predetermined interval; and
    (f) cruise control execution means for executing cruise control by storing the vehicle speed detected at the time the speed set switch is operated as a desired vehicle speed and operating the actuator such that the vehicle speed detected at the predetermined interval becomes the stored desired vehicle speed,
    wherein the improvement comprises:
    (g) throttle opening detection means for detecting an actual opening of the throttle valve at a predetermined interval;
    (h) throttle opening command detection means for detecting at a predetermined interval a throttle opening command issued by the operator using the accelerator;
    (i) desired throttle opening control execution means for executing desired throttle opening control by setting a desired throttle opening in accordance at least with the detected throttle opening command at a predetermined interval and operating the actuator such that the detected actual throttle opening becomes the desired throttle opening;
    (j) throttle opening determination means for determining whether, when the cruise control is in effect, one of the throttle opening command and the desired throttle opening is in a predetermined relationship with the actual throttle opening; and
    (k) control switchover means for switching the cruise control to the desired throttle opening control when it is discriminated that one of the throttle opening command and the desired throttle opening is in the predetermined relationship with the actual throttle opening and a disable condition has been established.

2. The cruise controller according to claim 1, wherein the control switchover means determines that the predetermined relationship has been established when one of the throttle opening command and the desired throttle opening is equal to or less than the actual throttle opening, and switches the cruise control to the desired throttle opening control upon discriminating the establishment of the disable condition.

3. The cruise controller according to claim 1, wherein the control switchover means includes:
    (l) throttle opening command change calculation means for calculating change of the throttle opening command per predetermined unit time; and
    (m) comparison means for comparing the calculated change with a threshold,
    and discriminates that the disable condition has been established when the calculated change is equal to or greater than the threshold in the negative direction, and switches the cruise control to the desired throttle opening control.

4. The cruise controller according to claim 1, wherein the control switchover means further includes:
    (n) storing means for storing the throttle opening command detected when the speed set switch is operated;
    (o) throttle opening command difference calculation means for calculating a difference obtained by subtracting a predetermined value from the stored throttle opening command; and
    (p) comparison means for comparing the calculated difference with the last value of the throttle opening command among those detected at the predetermined intervals,
    and discriminates that the disable condition has been established when the last value of the throttle opening command is equal to or less than the calculated difference, and switches the cruise control to the desired throttle opening control.

5. The cruise controller according to claim 1, wherein the control switchover means further includes:
    (q) vehicle speed difference calculation means for calculating a difference obtained by subtracting a predetermined value from the desired vehicle speed; and
    (r) comparison means for comparing the calculated difference with the last value of the vehicle speed among those detected at the predetermined intervals,
    and discriminates that the disable condition has been established when the last value of the vehicle speed is equal to or less than the calculated difference, and switches the cruise control to the desired throttle opening control.

6. The cruise controller according to claim 1, wherein the cruise control execution means includes:
    (s) vehicle speed reaching determination means for determining whether the last value of the vehicle speed among those detected at the predetermined intervals has reached the desired vehicle speed; and
    (t) desired vehicle speed increasing means for increasing the desired vehicle speed by a predetermined value when it is discriminated that the last value of the vehicle speed has reached the desired vehicle speed.

7. The cruise controller according to claim 1, wherein the cruise control execution means further includes:

(u) brake operation detection means for detecting operation of a brake;

(v) vehicle speed determination means for comparing the last value of the vehicle speed among those detected at the predetermined intervals with the desired vehicle speed to determine whether the last value of the vehicle speed is equal to or less than the desired vehicle speed, when the brake operation is detected during execution of the cruise control; and (w) desired vehicle speed substituting means for substituting the last value of the vehicle speed for the desired vehicle speed when it is discriminated that the last value of the vehicle speed is equal to or less than the desired vehicle speed.

8. The cruise controller according to claim 1, wherein the cruise control execution means further includes:

(x) vehicle speed determination means for comparing the last value of the vehicle speed among those detected at the predetermined intervals with the desired vehicle speed to determine whether the last value of the vehicle speed is equal to or less than the desired vehicle speed; and (y) desired vehicle speed substituting means for substituting the last value of the vehicle speed for the desired vehicle speed when it is discriminated that the last value of the vehicle speed is equal to or less than the desired vehicle speed.

9. The cruise controller according to claim 1, wherein the control switchover means determines that the predetermined relationship has been established when one of the throttle opening command and the desired throttle opening is near the actual throttle opening, and switches the cruise control to the desired throttle opening control upon discriminating the establishment of the disable condition.

10. The cruise controller according to claim 9, wherein the control switchover means determines that the predetermined relationship has been established when a difference between one of the throttle opening command and the desired throttle opening and the actual throttle opening is within a range of ±5 degrees, and switches the cruise control to the desired throttle opening control upon discriminating the establishment of the disable condition.

11. The cruise controller according to claim 1, further including:

(z) a clutch that makes or breaks a connection between the engine and a transmission;

(α) throttle full-closed control execution means for executing throttle full-closed control by operating the actuator such that the detected actual throttle opening becomes full closed; and (β) clutch operation determination means for determining whether the clutch was operated, and the control switchover means switches the cruise control to the throttle full-closed control when it is discriminated that the clutch was operated.

12. The cruise controller according to claim 11, wherein the clutch operation determination means includes:

(γ) engine rpm detection means for detecting an engine rpm at a predetermined interval;

(δ) engine rpm storing means for storing the engine rpm detected at the time the speed set switch is operated as a cruise control start engine rpm;

(ε) engine rpm determination means for determining whether the last value of the engine rpm among those detected at predetermined time intervals exceeds the stored cruise control start engine rpm by a predetermined value or more; and (ζ) vehicle speed determination means for determining whether the last value of the vehicle speed is equal to or less than the desired vehicle speed, and discriminates that the clutch was operated when it is discriminated that the last value of the engine rpm exceeds the cruise control start engine rpm by the predetermined value or more and the last value of the vehicle speed is equal to or less than the desired vehicle speed.

13. The cruise controller according to claim 11, wherein the clutch operation determination means further includes:

(η)clutch operation detection means for producing an output when the clutch is operated, and discriminates that the clutch was operated based on the output of the clutch operation detection means.

14. The cruise controller according to claim 11, wherein the control switchover means includes:

(θ) throttle opening difference calculation means for calculating a difference between the throttle opening command and the actual throttle opening and compares the absolute value of the calculated difference with a predetermined value, and switches the throttle full-closed control to the desired throttle opening control when it is discriminated that the absolute value of the calculated difference is less than the predetermined value.

15. The cruise controller according to claim 11, wherein the control switchover means further includes:

(ι) engine rpm detection means for detecting an engine rpm at a predetermined interval;

(κ) engine rpm storing means for storing the engine rpm detected at the time the speed set switch is operated as a cruise control start engine rpm;

(λ) first ratio calculation means for calculating a ratio obtained by dividing the cruise control start engine rpm by the desired vehicle speed as a first ratio;

(μ) second ratio calculation means for calculating a ratio obtained by dividing the last value of the engine rpm among those detected at the predetermined time intervals by the last value of the vehicle speed among those detected at the predetermined time intervals as a second ratio; and (ν) ratio difference calculation means for calculating a difference between the first ratio and the second ratio, and switches the throttle full-closed control to the cruise control when the absolute value of the calculated difference between the first ratio and the second ratio is less than a predetermined value, while continues the throttle full-closed control when the absolute value of the calculated difference between the first ratio and second ratio is equal to or greater than the predetermined value, during execution of the throttle full-closed control.

16. The cruise controller according to claim 11, wherein the control switchover means switches among the cruise control, the throttle full-closed control and desired throttle opening control in response to operating state.

17. The cruise controller according to claim 16, in which, when it is discriminated that the clutch was operated during execution of the cruise control, the control switchover means executes the throttle full-closed control and then switches to the desired throttle opening control.

* * * * *